United States Patent
Ue et al.

(10) Patent No.: US 9,383,567 B2
(45) Date of Patent: Jul. 5, 2016

(54) MICROSCOPE SYSTEM, OBJECTIVE LENS UNIT, AND MICROSCOPE MAIN BODY

(71) Applicant: OLYMPUS CORPORATION, Shibuya-ku, Tokyo (JP)

(72) Inventors: Yoshihiro Ue, Hidaka (JP); Tetsuya Tajima, Tokyo (JP); Daisuke Nishiwaki, Hino (JP); Kaori Higuchi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 30 days.

(21) Appl. No.: 14/329,388

(22) Filed: Jul. 11, 2014

(65) Prior Publication Data

US 2015/0022882 A1    Jan. 22, 2015

(30) Foreign Application Priority Data

Jul. 18, 2013   (JP) ................................ 2013-149731
Apr. 3, 2014   (JP) ................................ 2014-077067

(51) Int. Cl.
    *G02B 21/06*       (2006.01)
    *G02B 21/24*       (2006.01)
    *G02B 7/14*        (2006.01)

(52) U.S. Cl.
    CPC ............. *G02B 21/06* (2013.01); *G02B 21/248* (2013.01); *G02B 7/14* (2013.01)

(58) Field of Classification Search
    CPC .. G02B 21/248; G02B 21/241; G02B 21/025; G02B 21/06; G02B 21/26
    USPC ......... 359/385, 381, 382, 383, 384, 388, 391, 359/392
    See application file for complete search history.

(56) References Cited

U.S. PATENT DOCUMENTS

| | | | |
|---|---|---|---|
| 6,239,905 B1 * | 5/2001 | Toyoda et al. ..... | G02B 21/0088 359/368 |
| 8,559,119 B2 | 10/2013 | Seifert | |
| 2004/0263962 A1 * | 12/2004 | Knittel ................... | G02B 21/34 359/396 |
| 2006/0250687 A1 | 11/2006 | Karaki et al. | |
| 2010/0033812 A1 * | 2/2010 | Fomitchov et al. | G02B 27/0068 359/383 |

(Continued)

FOREIGN PATENT DOCUMENTS

GB            271993 A      6/1927

(Continued)

OTHER PUBLICATIONS

Partial European Search Report (PESR) dated Dec. 3, 2014 issued in counterpart European Application No. 14176667.5.

*Primary Examiner* — Stephone B Allen
*Assistant Examiner* — Rahman Abdur
(74) *Attorney, Agent, or Firm* — Holtz, Holtz & Volek PC

(57) ABSTRACT

A microscope system includes: a main body portion having an optical system for forming an image from at least observation light from a specimen; an objective lens unit having an objective lens for taking in the observation light and having a base portion with an approximately belt shape for holding the objective lens on one end; and a unit attachment portion that is held by the main body portion and is configured to detachably attach the base portion at a position where at least an optical axis of the objective lens coincides with an optical path of the observation light.

15 Claims, 18 Drawing Sheets

(56) References Cited

U.S. PATENT DOCUMENTS

2010/0315707 A1* 12/2010 Gilbert et al. .......... G02B 21/02
                                                      359/381
2013/0222898 A1   8/2013 Gilbert et al.
2014/0015953 A1   1/2014 Turgeman et al.

FOREIGN PATENT DOCUMENTS

| JP | 3690834 B2 | 8/2005 |
| JP | 2007286440 A | 11/2007 |
| JP | 2012128419 A | 7/2012 |
| WO | 2012097191 A2 | 7/2012 |

* cited by examiner

CONTROL SIGNAL

MICROSCOPE SYSTEM, OBJECTIVE LENS UNIT, AND MICROSCOPE MAIN BODY

CROSS-REFERENCE TO RELATED APPLICATIONS

This application is based upon and claims the benefit of priority from Japanese Patent Application No. 2013-149731, filed on Jul. 18, 2013 and Japanese Patent Application No. 2014-077067, filed on Apr. 3, 2014, the entire contents of which are incorporated herein by reference.

BACKGROUND

1. Technical Field

The disclosure relates to a microscope system, an objective lens unit, and a microscope main body used for observing a specimen image by irradiating the specimen with irradiation light and receiving light that is reflected from the specimen or that is generated from the specimen.

2. Related Art

In the medical and biological fields, microscopes for observing specimens such as cells by irradiating the specimens with light have been conventionally used. Moreover, in the industrial fields, microscopes have been used in various purposes including the quality control of metal tissues, research and development of new materials, inspections of electronic devices and magnetic heads, etc. As the observation of the specimen through the microscope, in addition to the visual observation with the use of an eyepiece or the like, such observation has been known that the specimen is photographed using an imaging element such as a CCD or a CMOS image sensor and the photographed image is displayed on a monitor.

As disclosed in Japanese Patent Application Laid-Open Publication No. 2007-286440 and Japanese Patent No. 3690834, for example, a conventional microscope includes a stage on which a specimen is disposed, a revolver for holding a plurality of objective lenses (for example, four to six lenses) with different magnification in a manner that the lenses can be exchanged relative to the specimen, a light source for emitting irradiation light, and the like that are attached to a microscope main body. The microscope main body is provided with an observation optical system for guiding at least observation light taken in by the objective lens toward an eyepiece or an image sensor.

In the conventional microscope, the specimen image can be observed at the desired magnification by disposing the desired objective lens on the optical axis of the observation light and the irradiation light while the revolver is rotated. In recent years, moreover, the kinds of the objective lens vary widely for enabling the observation of various specimens.

SUMMARY

In accordance with some embodiments, a microscope system, an objective lens unit, and a microscope main body are presented.

In some embodiments, a microscope system includes: a main body portion having an optical system for forming an image from at least observation light from a specimen; an objective lens unit having an objective lens for taking in the observation light and having a base portion with an approximately belt shape for holding the objective lens on one end; and a unit attachment portion that is held by the main body portion and is configured to detachably attach the base portion at a position where at least an optical axis of the objective lens coincides with an optical path of the observation light.

In some embodiments, an objective lens unit is used for a microscope system including: a main body portion having an optical system for forming an image from at least observation light from a specimen; and a unit attachment portion that is held by the main body portion. The objective lens unit includes: an objective lens for taking in the observation light; and a base portion that has an approximately belt shape for holding the objective lens on one end, and is configured to be detachably attached to the unit attachment portion at a position where at least an optical axis of the objective lens coincides with an optical path of the observation light.

In some embodiments, a microscope main body is used for a microscope system for focusing observation light from a specimen. The microscope main body includes: an optical system for forming an image from at least the observation light; and a unit attachment portion configured to attach a base portion of an objective lens unit having an objective lens for taking in the observation light and having the base portion with an approximately belt shape for holding the objective lens on one end, at a position where an optical axis of the objective lens coincides with an optical path of the observation light.

The above and other features, advantages and technical and industrial significance of this invention will be better understood by reading the following detailed description of presently preferred embodiments of the invention, when considered in connection with the accompanying drawings.

DETAILED DESCRIPTION

Modes for carrying out the invention will be described below with reference to the attached drawings. The invention is not limited to the embodiments below. In each drawing used in the description below, the shape, the size, and the positional relation are schematically shown to such a degree that the content of the present invention can be understood. In other words, the present invention is not limited to the shape, the size, and the positional relation illustrated in each drawing only.

First Embodiment

Figure 1:
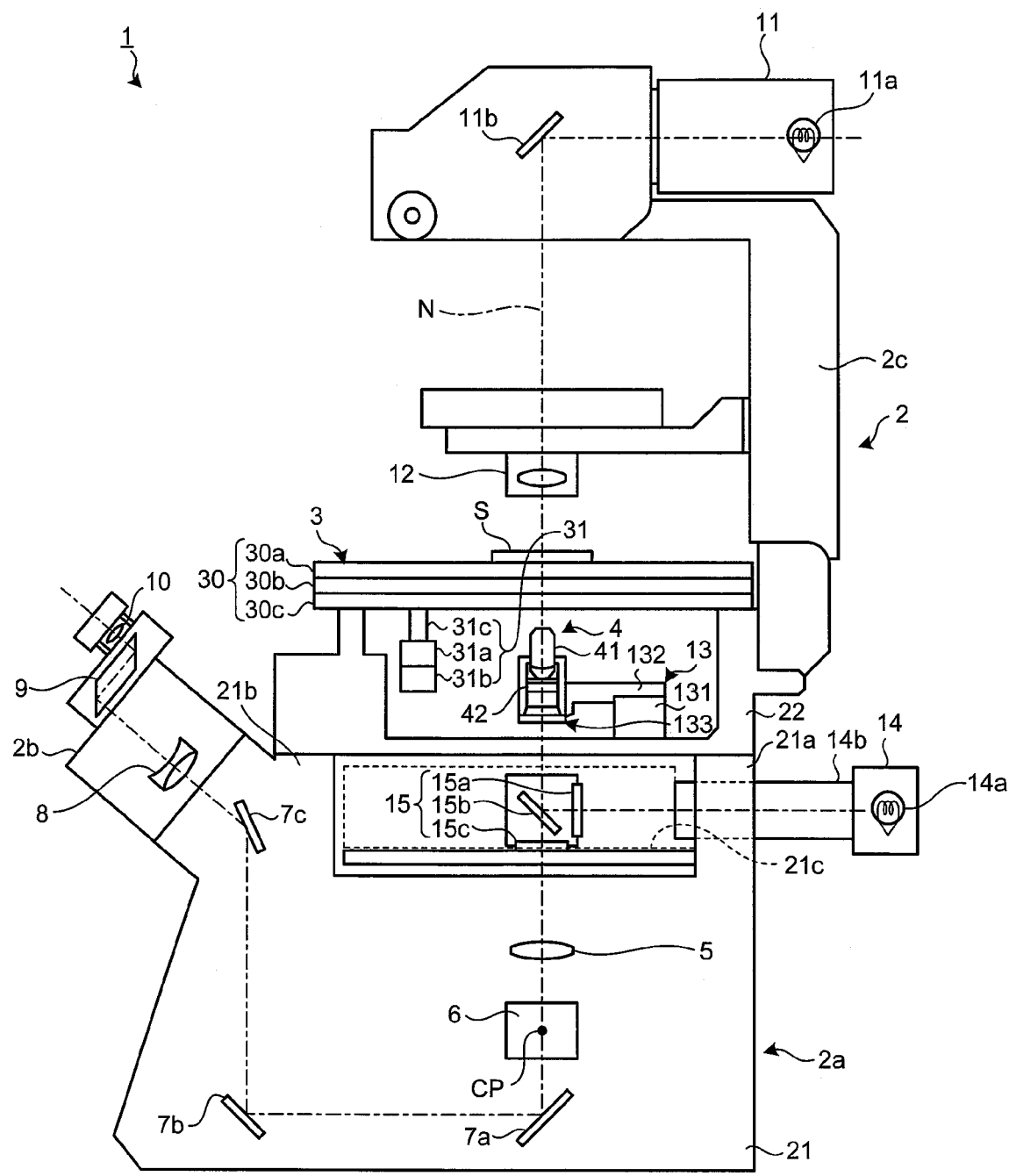
FIG. 1 is a schematic view illustrating an entire structure of a microscope system according to a first embodiment of the present invention.

First, an inverted microscope system according to a first embodiment of the present invention will be described with reference to the drawings. FIG. 1 is a schematic view illustrating the entire structure of the microscope system according to the first embodiment. As illustrated in FIG. 1, a microscope system 1 is an inverted microscope used for observing a specimen S specifically colored with, for example, a fluorescent pigment by focusing observation light from the specimen S, and includes a microscope main body 2 including a main body portion 2a as a foundation of the microscope system 1, a lens-barrel portion 2b detachably attached to the main body portion 2a and provided with at least an eyepiece, and a supporting column 2c extending from the main body portion 2a in a direction of an optical path N of the irradiation light to be delivered to the specimen S.

The main body portion 2a includes a main body side base portion 21 having mirror legs 21a and 21b extending in approximately columnar shape to form a concave shape in a side view, and a holder 22 that has a concave shape, is supported by the mirror legs 21a and 21b, and holds a stage 3 and an objective lens 41, which are described below. The main body side base portion 21 may be provided with a control board that controls the entire microscope system 1. The control board may relay the power supplied from the outside to each unit, or may have a power source incorporated to relay the power to each unit.

The main body side base portion 21 includes inside a tube lens 5 that forms an image by focusing the light taken in by the objective lens 41, an optical path changing prism 6 that transmits the light focused by the tube lens 5 and that bends the light in a specified direction, and mirrors 7a, 7b, and 7c that reflect the light transmitted through the optical path changing prism 6 in a specified direction.

The optical path changing prism 6 may be provided so as to be able to be exchanged among a plurality of optical members with different transmittance, and may include any of an optical member (optical path changing prism 6) that transmits 50% of light and reflects 50% of light, an optical member that reflects all the light formed by the tube lens 5 in a specified direction, and an optical member that transmits all the light focused by the tube lens 5 so that the members can be exchanged freely on the optical path N. At the position to which the optical path changing prism 6 reflects the light, a camera port CP connected to a CCD camera or the like is provided. The light bent by the optical path changing prism 6 in a direction orthogonal to the optical path N is introduced to the camera port CP.

When the lens-barrel portion 2b is connected to the main body portion 2a, the observation light of the specimen S is introduced into the lens-barrel portion 2b from the main body side base portion 21. The lens-barrel portion 2b includes a tube lens 8 for focusing the observation light reflected from the mirror 7c, a prism 9 for bending the observation light focused by the tube lens 8 in a specified direction, and an eyepiece 10 for condensing the light bent by the prism 9. The eyepiece 10 is a lens for magnifying the formed intermediate image.

The supporting column 2c is provided with a first lamp house 11 having a light source 11a and emitting transmission illumination light, and a condenser 12 supported to be able to move up and down along the optical path N of the objective lens 41. The first lamp house 11 is a case incorporating the light source 11a formed by a halogen lamp or the like, and is supported by the supporting column 2c. The light from the first lamp house 11 is reflected toward the specimen S (objective lens 41) by a mirror 11b.

The holder 22 holds the stage 3 on which the specimen S is mounted at an end of the holder 22, and moreover holds a unit attachment portion 13 to which the objective lens unit 4 having the objective lens 41 for taking in at least the observation light from the specimen S on the stage 3 can be detachably attached in the hollow space with the concave shape.

The main body side base portion 21 is provided with a second lamp house 14 having a light source 14a and emitting epi-illumination light. The second lamp house 14 is a case incorporating the light source 14a formed by a mercury lamp or the like, and is disposed detachably to the main body side base portion 21 through a floodlight tube 14b. The floodlight tube 14b can transmit the light emitted from the light source 14a of the second lamp house 14. Note that the light source 14a may be replaced by a laser.

An inner region 21c formed by the mirror legs 21a and 21b of the main body side base portion 21 is provided with a mirror unit 15 that changes the optical path of the epi-illumination light from the light source 14a, the light reflected from or emitted from the specimen S, or the light transmitted through the specimen S.

The mirror unit 15 includes an excitation filter 15a, a dichroic mirror 15b, and an absorption filter 15c. The excitation filter 15a extracts (transmits) the light corresponding to the excitation wavelength from the emission light emitted from the light source 14a. The dichroic mirror 15b reflects the light with a specified wavelength from the light emitted from the light source 14a, and transmits the light with a specified wavelength from the light emitted from the specimen S. The absorption filter 15c extracts the light with a desired wavelength from the light emitted from the specimen S. The mirror unit 15 may be configured so that a plurality of, for example eight, mirror units is removably inserted into a mirror cassette in a manner that the mirror units 15 can advance or retract relative to the optical path of the light emitted from the light source 14a with a built-in motor (not shown).

The stage 3 includes a mount unit 30 for having the specimen S mounted thereon, and a stage operation unit 31 for operating the position of the specimen S disposed on the mount unit 30. The mount unit 30 is formed by sequentially stacking a first member 30a, a second member 30b, and a third member 30c each having a plate shape. In the mount unit 30, for example, the first member 30a and the second member 30b are moved on a flat plane on the third member 30c with the third member 30c used as a reference (fixed) by the use of the stage operation unit 31. On this occasion, the specimen S is mounted on the first member 30a, and the first member 30a and the second member 30b move in directions orthogonal to each other on a plane parallel to the main plane. Each of the first member 30a to the third member 30c is provided with an aperture (not shown) through which the optical path N transmits when attached to the main body portion 2a. Note that the apertures of the first member 30a and the second member 30b are formed with a size for including the optical path N regardless of the movement of the first member 30a and the second member 30b.

The stage operation unit 31 includes input units 31a and 31b to which the travel amount of the first member 30a and the second member 30b can be input, and a support member 31c which supports the input units 31a and 31b and which sends the travel amount input through the input units 31a and 31b to the first member 30a and the second member 30b. In the first embodiment, the input units 31a and 31b are formed by, for example, the rack and pinion and through the input units 31a and 31b, the travel amount of the first member 30a and the second member 30b according to the amount of rotation is input. The first member 30a and the second member 30b may move automatically through the input bottom provided for the main body portion 2a or the like.

In the microscope system 1 with the above structure, in the case of the transmission illumination, when the specimen S is irradiated with the transmission illumination light from the light source 11a through the mirror 11b, an intermediate image by the observation light having transmitted through the specimen S or the observation light emitted from the specimen S is formed on the observation optical path (optical path N) by the objective lens 41 and the tube lens 5, and the image is formed at the position of the eyepiece through the tube lens 8; thus, the image is observed visually by an observer as the specimen image by the transmission light. Note that the transmission light observation is employed in the case of brightfield microscopy, phase contrast microscopy, differential interference contrast microscopy, or the like.

In the case of the epi-illumination, the epi-illumination light from the light source 14a is collimated into a parallel light flux in the floodlight tube 14b, and the light with the excitation wavelength is selected by the excitation filter 15a from the light with the wavelengths included in the epi-illumination light, and then the light with the wavelength selected by the excitation filter 15a is reflected toward the objective lens 41 through the dichroic mirror 15b. When the illumination light reflected from the dichroic mirror 15b is delivered to the specimen S through the objective lens 41 as the epi-illumination light, the fluorescent pigment or the fluorescent protein in the specimen S is excited and the fluorescent light is emitted. The generated fluorescent light is taken into the objective lens 41 as an image, and the light transmits through the dichroic mirror 15b and the absorption filter 15c; then, the intermediate image of the specimen S located on the optical path N is formed on the observation optical path by the objective lens 41 and the tube lens 5. The image is formed at the position of the eyepiece 10 through the tube lens 8 and visually observed by the observer as the specimen image by the emission of the fluorescent light or the like.

Figure 2:
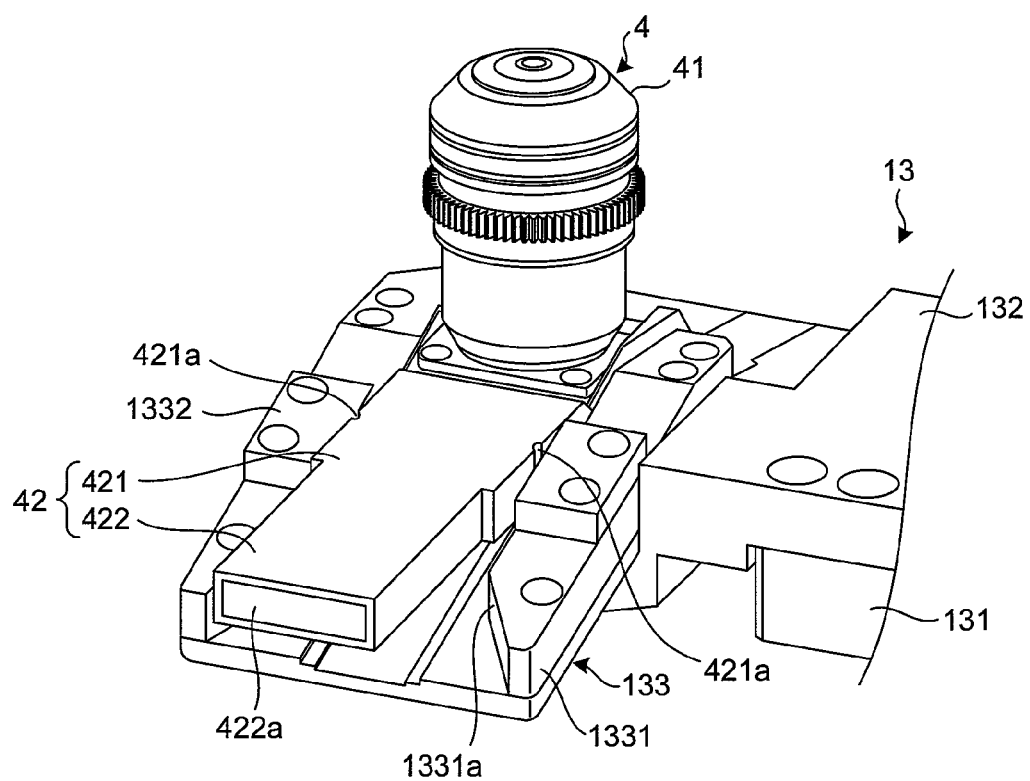
FIG. 2 is a perspective view schematically illustrating a structure of a main part of the microscope system according to the first embodiment of the present invention.
Figure 3:
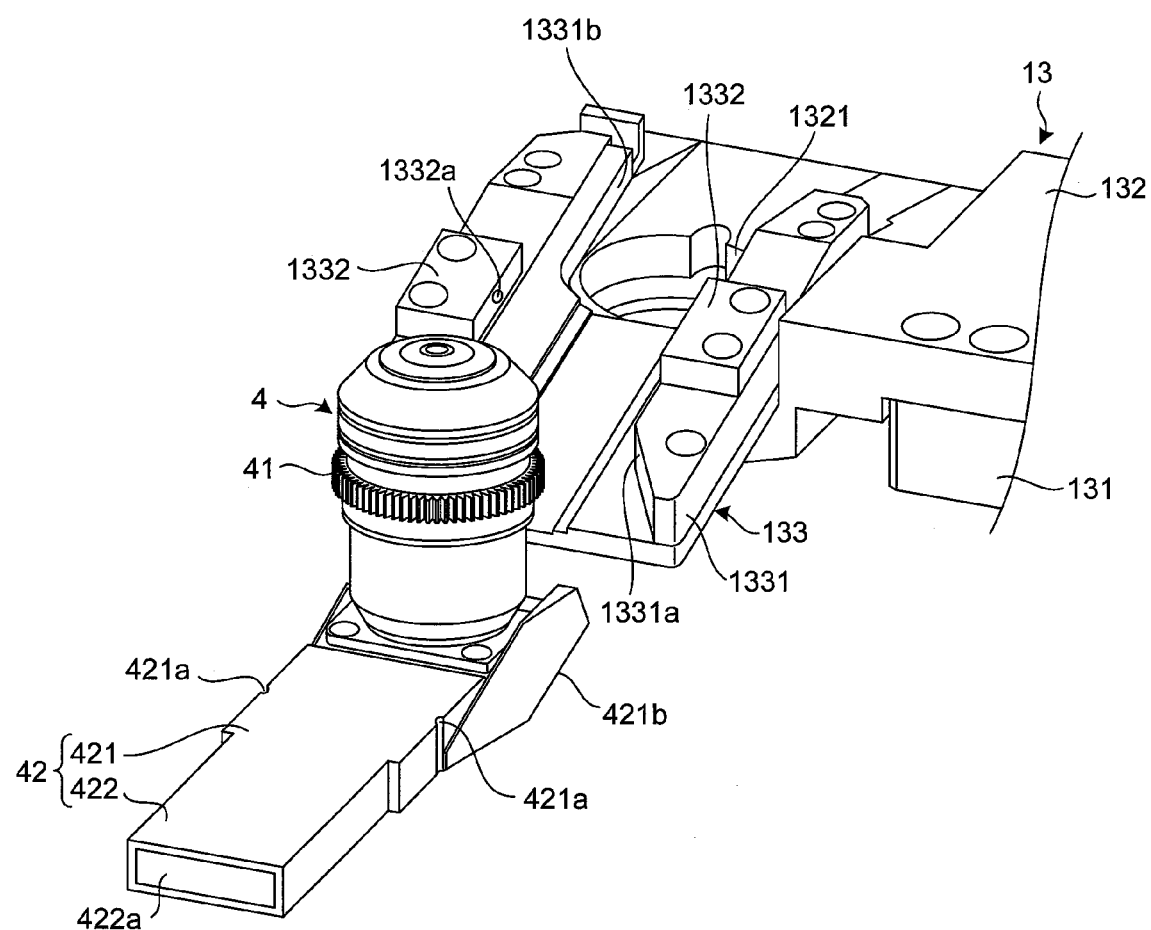
FIG. 3 is a perspective view schematically illustrating the structure of the main part of the microscope system according to the first embodiment of the present invention.

Subsequently, the objective lens unit 4 and the unit attachment portion 13 will be described with reference to FIG. 2 and FIG. 3. FIG. 2 is a perspective view schematically illustrating the structure of a main part of the microscope system according to the first embodiment, in which the objective lens unit 4 is attached to the unit attachment portion 13. FIG. 3 is a perspective view schematically illustrating the structure of the main part of the microscope system according to the first embodiment, in which the objective lens unit 4 is detached from the unit attachment portion 13.

The objective lens unit 4 includes the objective lens 41 for taking in the observation light and a unit side base portion 42 (base portion) with an approximately belt shape holding the objective lens 41 on one end. The unit side base portion 42 includes an approximately-belt-shaped objective lens holder 421 for holding the objective lens 41 on one end, and a belt-shaped grip unit 422 extending from the other end of the objective lens holder 421. The grip unit 422 is a portion held by a user when the objective lens unit 4 is attached to the unit attachment portion 13.

Each of side surfaces of the objective lens holder 421 that is orthogonal to the main plane and extends in parallel to the longitudinal direction is provided with a cut portion 421a (second engagement unit) which is a cut groove extending in the thickness direction. Moreover, a side surface of the objective lens holder 421 that is orthogonal to the main plane and that is on the side opposite to the surface connecting to the grip unit 422 is provided with a slidable unit 421b that slides on the attachment surface (a guide groove to be described below) of the unit attachment portion 13 when attached to the unit attachment portion 13. The surface of the slidable unit 421b that slides on the attachment surface of the unit attachment portion 13 is tilted relative to the main plane of the objective lens holder 421.

A side surface of the grip unit 422 that is orthogonal to the main plane and that is on the side opposite to the surface connecting to the objective lens holder 421 (on the other end side of the unit side base portion 42) is provided with a display unit 422a where the information of the objective lens 41 held by the unit side base portion 42 is displayed.

The display unit 422a displays the information including at least the kind of the objective lens 41, the working distance (WD), and the magnification. In addition to this, the information of the kind of the immersion oil that can be used may be displayed. The information of the kind of the objective lens 41 includes the information related to the bright-field microscopy, the phase contrast microscopy, the differential interference contrast microscopy, and the fluorescence observation, and the correction level for the chromatic aberration. The color of the grip unit 422 may be different depending on the information of the objective lens 41.

The unit attachment portion 13 includes a supporter 131 fixed to the holder 22, an intermediate portion 132 supported by the supporter 131 and extending in a direction orthogonal to the optical path N, and a unit holder 133 held by the intermediate portion 132 and detachably holding the objective lens unit 4.

The intermediate portion 132 is provided with an aperture portion 1321 having an aperture with an approximately circular shape through which the optical path N transmits when attached to the holder 22.

The unit holder 133 is held by the intermediate portion 132 and includes a tilt portion 1331 having a tilt surface, and a click mechanism 1332 (first engagement unit) provided on the tilt portion 1331 and engaged with the cut portion 421a of the objective lens unit 4 to control the movement of the objective lens unit 4.

The tilt portion 1331 is disposed so that a plane passing along the tilt surface intersects with the optical path N, and extends obliquely downward on the main body portion 2a from the intermediate portion 132. The tilt portion 1331 is provided with a guide groove 1331a (guide unit) that guides the attachment direction of the objective lens holder 421 of the objective lens unit 4. The groove width (distance between the opposite side walls) of the guide groove 1331a is approximately equal to the maximum width of the objective lens holder 421. The depth (height of the side wall) of the guide groove 1331a is smaller than the plate thickness of the objective lens holder 421. The guide groove 1331a is provided with a concave portion 1331b that connects to the aperture portion 1321 and that forms a hollow space through which the illumination light and the observation light transmit when attached to the holder 22.

The click mechanism 1332 is provided for each of edges of the tilt portion 1331 in the groove width direction of the guide groove 1331a. The click mechanism 1332 has a ball 1332a to be energized by a spring or the like. The ball 1332a is provided to protrude inward (toward the guide groove 1331a) relative to the plane passing along the side wall of the guide groove 1331a. The ball 1332a is provided to advance or retract freely in a direction approximately orthogonal to the plane passing along the side wall of the guide groove 1331a with the energizing force from the spring.

The diameter of the ball 1332a of the click mechanism 1332 is preferably larger than the groove width of the cut portion 421a in the part that is exposed to the outside to be engaged with the cut portion 421a. The energizing force from the spring may be such a degree that when the cut portion 421a and the ball 1332a are engaged with each other and a load in a direction opposite to the attachment direction is applied by at least the own weight of the objective lens unit 4, the ball 1332a is not retracted.

Here, it is preferable that a dovetail groove constituting the hollow space with an approximately concave-shaped section is formed at the bottom of the guide groove 1331a and the slidable unit 421b has a projection that projects with a sectional shape according to the dovetail groove of the guide groove 1331a from the main plane. Note that the projection may extend along the attachment direction of the objective lens unit 4 or be provided at the center of the attachment direction or be provided at each end in the attachment direction. The projection may be formed at any position or with any shape as long as the projection can be housed in the dovetail groove.

Figure 4:
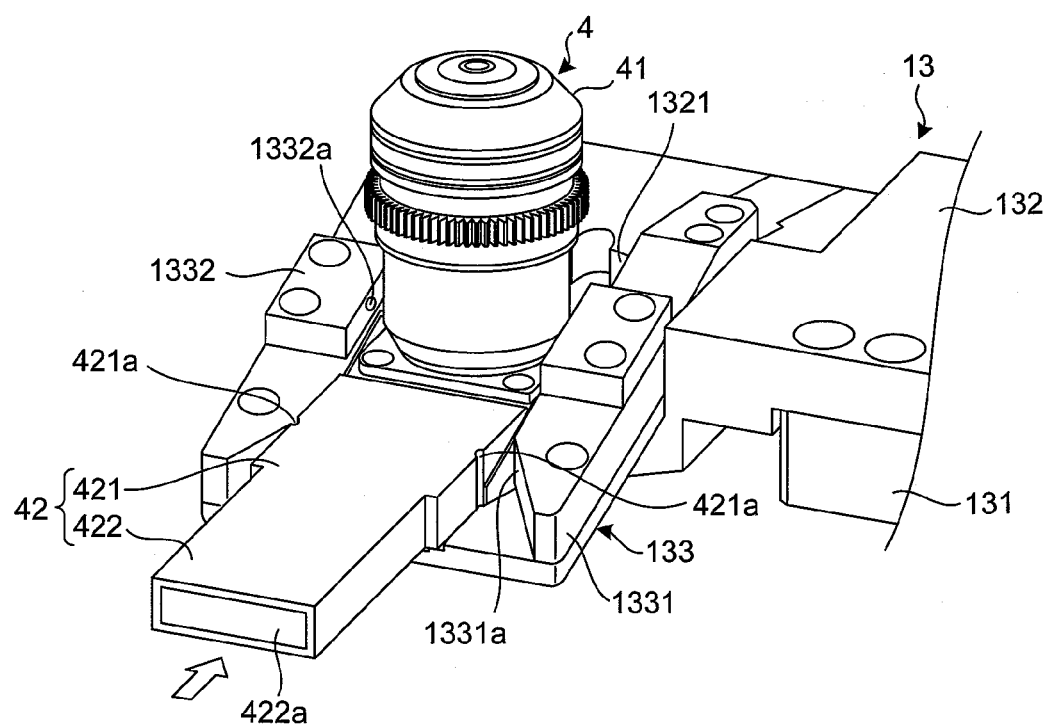
FIG. 4 is a perspective view schematically illustrating the structure of the main part of the microscope system according to the first embodiment of the present invention.

FIG. 4 is a perspective view schematically illustrating a main part of the microscope system according to the first embodiment, and describing the attachment of the objective lens unit 4 to the unit attachment portion 13. When the objective lens unit 4 is attached to the unit attachment portion 13, a user grips the grip unit 422 and inserts the objective lens unit 4 to the unit attachment portion 13 (guide groove 1331a) from obliquely below the stage 3. On this occasion, the objective lens unit 4 is inserted while the slidable unit 421b is slid along the guide groove 1331a.

On this occasion, when the slidable unit 421b has the projection, the projection is housed in the dovetail groove of the guide groove 1331a. This can prevent the slidable unit 421b from moving deviated from the attachment direction the guide groove 1331a (slide direction, arrow in FIG. 4) when the objective lens unit 4 is attached to the unit attachment portion 13. The ball 1332a of the click mechanism 1332 is in pressure contact with the side surface of the objective lens holder 421.

After that, when the insertion is continued, the cut portion 421a of the objective lens holder 421 is engaged with the ball 1332a of the click mechanism 1332. At the position where the objective lens unit 4 is stopped by this engagement, the objective lens 41 is disposed on the concave portion 1331b (see FIG. 2).

Here, when the objective lens 41 is held by the objective lens holder 421 so that the optical axis is orthogonal to the mount surface (main plane) of the objective lens holder 421, the sum of the angle between the optical path N and the bottom of the guide groove 1331a and the angle between the slide surface of the slidable unit 421b and the main plane of the objective lens holder 421 is 90°. Thus, when the objective lens unit 4 is attached to the unit attachment portion 13, the slidable unit 421b is slid while the state where the main plane of the objective lens holder 421 is orthogonal to the optical path N is maintained, and the optical axis of the objective lens 41 can be moved while the optical axis is maintained to be parallel to the optical path N. Therefore, even when the immersion oil is on the upper surface of the objective lens 41, the objective lens 41 can be set without spilling the immersion oil.

Note that when the objective lens unit 4 is attached to the unit attachment portion 13, it is not always necessary to make the movement while maintaining the state that the optical axis of the objective lens 41 is parallel to the optical path N as long as the optical axis of the objective lens 41 coincides with the optical path N at the position where the cut portion 421a of the objective lens holder 421 is caught by the ball 1332a of the click mechanism 1332 and stopped thereby (at the position where the placement of the objective lens 41 is completed). The angle between the optical path N and the bottom of the guide groove 1331a except the position where the placement of the objective lens 41 is completed may be set to, for example, the angle according to the easiness of the insertion and removal between the objective lens unit 4 and the unit attachment portion 13.

When the objective lens unit 4 is attached to the unit attachment portion 13, the side surface provided with the display unit 422a extends outward from the unit attachment portion 13 and is visible from the side surface of the main body portion 2a. Thus, the information of the objective lens 41 attached to the unit attachment portion 13 can be easily checked.

On the other hand, when the objective lens unit 4 is removed, the user pulls out the objective lens unit 4 in a direction opposite to the attachment direction while holding the grip unit 422, whereby the ball 1332*a* retracts to cancel the engaged state between the cut portion 421*a* and the ball 1332*a*. After that, continuing to pull out the objective lens unit 4 can remove the objective lens unit 4 from the unit attachment portion 13, and thus the objective lens unit 4 can be replaced by the objective lens unit for holding another kind of objective lens.

Figure 7:
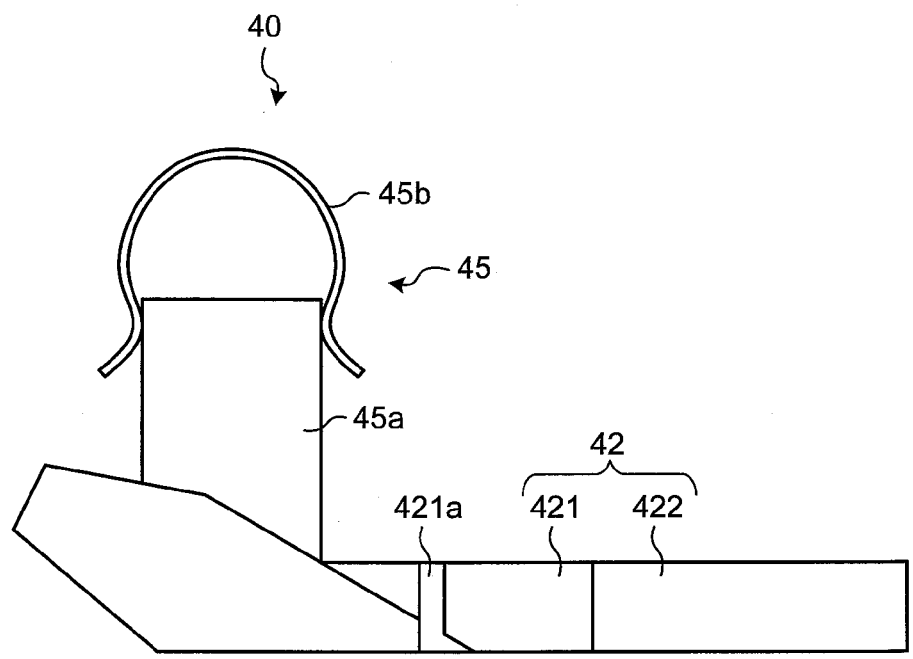
FIG. 7 is a schematic view illustrating an example of a structure of an attachment unit of the microscope system according to the first embodiment of the present invention.
Figure 8:
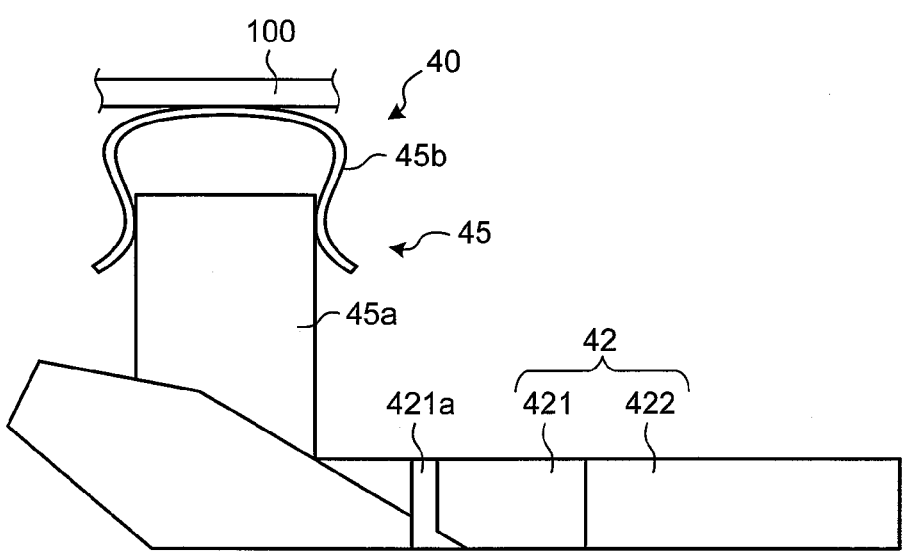
FIG. 8 is a schematic view illustrating an example of usage of the attachment unit of the microscope system according to the first embodiment of the present invention.

FIG. 5, FIG. 6, and FIG. 9 to FIG. 15 are schematic views illustrating examples of other structures of the objective lens unit of the microscope system according to the first embodiment. The objective lens unit 4 may have a function of providing additional functions to the objective lens 41 in addition to holding the objective lenses 41 with different magnifications. Alternatively, the attachment unit that does not hold the objective lens 41 as illustrated in FIG. 7 and FIG. 8 may be attached to the unit attachment portion 13.

Figure 5:
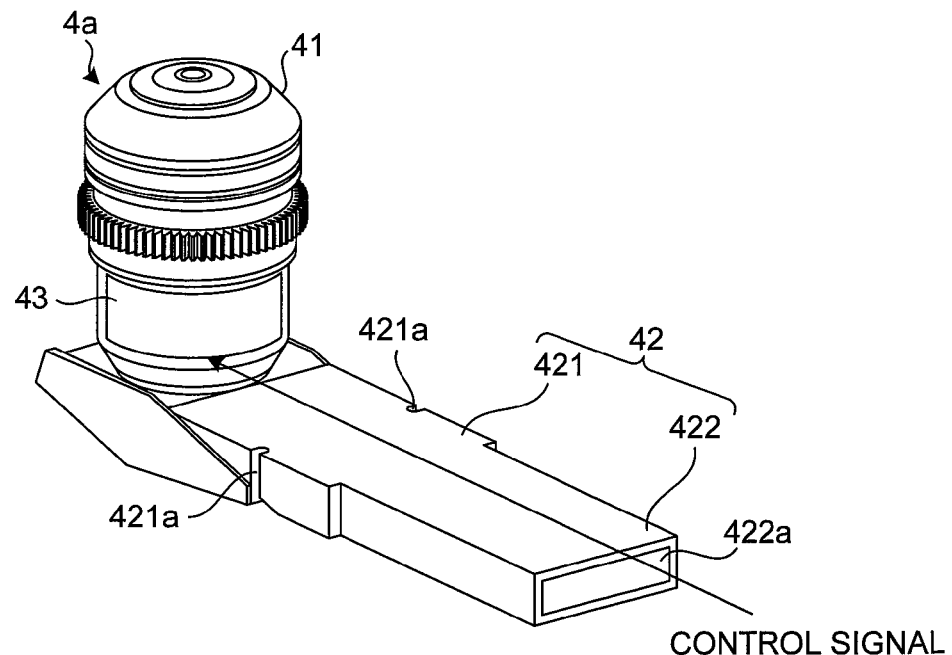
FIG. 5 is a perspective view schematically illustrating an example of another structure of an objective lens unit of the microscope system according to the first embodiment of the present invention.

FIG. 5 is a perspective view schematically illustrating an example of another structure of the objective lens unit of the microscope system according to the first embodiment. An objective lens unit 4*a* illustrated in FIG. 5 has a sheet-shaped heating member 43 provided for a part of the side surface of the objective lens 41. The heating member 43 is heated based on a control signal from an external controller, which is not shown, and maintains specified temperature. This enables the objective lens 41 to be maintained at a set temperature.

For example, in the case of observing the cultivation of the cell as the specimen S over time, the environment temperature needs to be maintained at approximately 37° C. In general, since the objective lens 41 is formed of a material with high heat efficiency, the heat dissipates to the outside through the objective lens 41, in which case the environment temperature around the specimen S may not be maintained at 37° C. In contrast to this, the objective lens unit 4*a* can maintain the temperature of the objective lens 41 to be specified temperature; therefore, it is possible to prevent the heat dissipation through the objective lens 41 and to achieve the observation with the environment temperature maintained.

Figure 6:
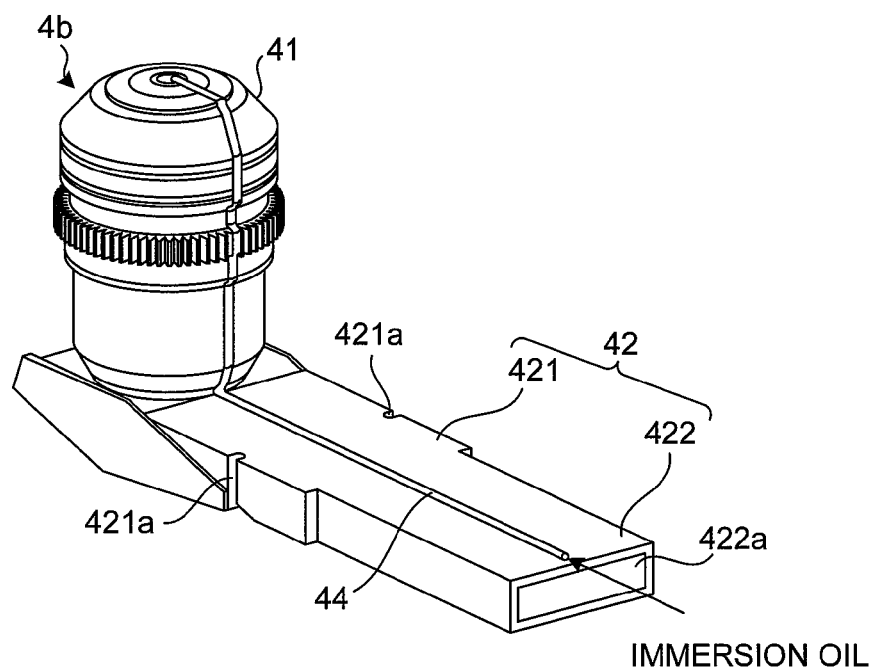
FIG. 6 is a perspective view schematically illustrating an example of another structure of an objective lens unit of the microscope system according to the first embodiment of the present invention.

FIG. 6 is a perspective view schematically illustrating an example of another structure of the objective lens unit of the microscope system according to the first embodiment. An objective lens unit 4*b* illustrated in FIG. 6 is provided with a supply tube 44 that supplies the immersion oil to the end of the objective lens 41. The immersion oil is fed to the supply tube 44 with an external liquid pumping mechanism such as a controller or a piston, which is not illustrated. This makes it possible to supply the immersion oil without retracting the stage 3 after the objective lens unit 4*b* is attached to the unit attachment portion 13, i.e., in the state that the objective lens 41 is disposed on the optical path N.

FIG. 7 is a schematic diagram illustrating an example of the structure of the attachment unit of the microscope system according to the first embodiment. FIG. 8 is a schematic diagram describing an example of usage of the attachment unit of the microscope system according to the first embodiment. In an attachment unit 40 illustrated in FIG. 7, the unit side base portion 42 holds an oil removal unit 45 having an oil-absorbent paper holding member 45*a* for holding oil-absorbent paper 45*b* as a remover for removing the immersion oil instead of the objective lens 41.

The oil-absorbent paper holding member 45*a* holds opposite ends of the oil-absorbent paper 45*b* having a band shape, for example, in the longitudinal direction. The oil-absorbent paper 45*b* has an approximately "U" shape projecting from the end of the oil-absorbent paper holding member 45*a*. Note that the oil-absorbent paper holding member 45*a* holds the oil-absorbent paper 45*b* by using a known fixing unit such as adhesion or clipping. The oil-absorbent paper 45*b* may be any paper as long as the paper can absorb the liquid to be removed such as the immersion oil.

Upon the attachment of the attachment unit 40 to the unit attachment portion 13 in a manner similar to the above objective lens unit, the oil-absorbent paper 45*b* absorbs the immersion oil attached to a dish 100 holding the specimen and removes the immersion oil from the dish 100. Thus, the immersion oil can be easily removed from the dish 100 just by inserting and removing the attachment unit 40 into and from the unit attachment portion 13 once or several times without moving the dish 100. Therefore, the observation without the use of the immersion oil and the observation with the use of the immersion oil can be simply switched; additionally, the observation without the use of the immersion oil can be conducted without any influence from the immersion oil. The oil removal unit 45 may be provided at the end of the objective lens unit 4*b* in the attachment direction.

Figure 9:
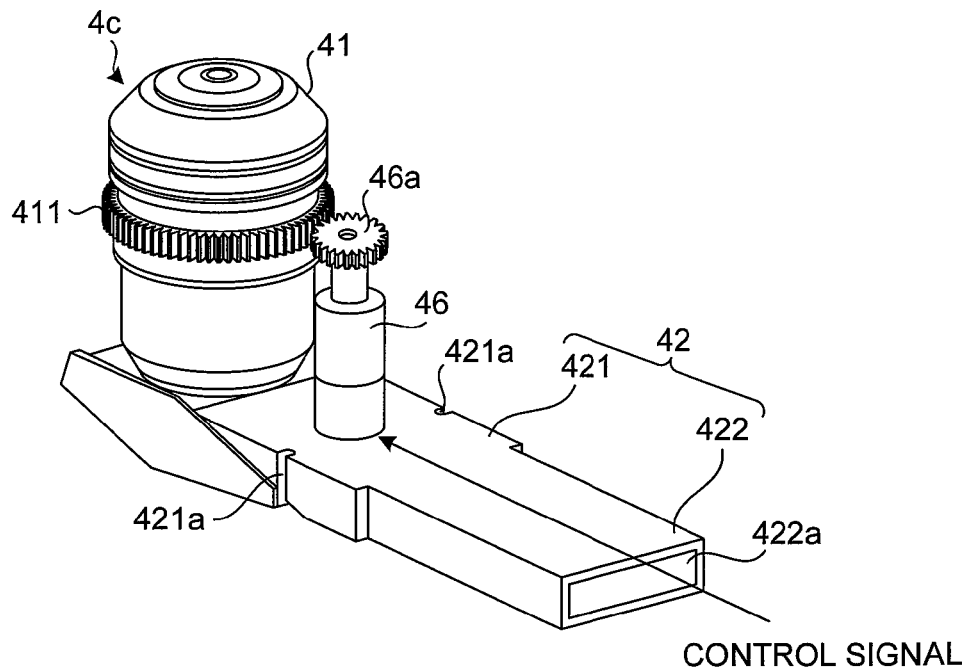
FIG. 9 is a perspective view schematically illustrating an example of another structure of the objective lens unit of the microscope system according to the first embodiment of the present invention.

FIG. 9 is a perspective view schematically illustrating an example of another structure of the objective lens unit of the microscope system according to the first embodiment. An objective lens unit 4*c* illustrated in FIG. 9 is provided with a motor 46 (driving source) for generating the power for rotating a correction collar 411 provided for the objective lens 41. Here, the objective lens 41 is provided with the correction collar 411 with an uneven shape along the circumferential direction of the side surface of the objective lens 41. The correction collar 411 is rotatably provided and moves the lens group (optical system) provided inside the objective lens 41 in the direction of the optical axis with the rotation of the correction collar 411. By the operation of the correction collar 411, the aberration (spherical aberration) can be corrected according to the thickness of the slide glass to have the specimen S mounted thereon or the cultivation vessel to have the specimen S housed therein.

At the end of the rotation shaft of the motor 46, a gear 46*a* is provided which meshes with the correction collar 411. The gear 46*a* is rotated by the rotation of the motor 46, and by transmitting the rotating power to the correction collar 411, rotates the correction collar 411. The motor 46 is, for example, a stepping motor. By using the stepping motor as the motor 46, the amount of rotation of the correction collar 411 can be decided by the number of given pulses; thus, the correction collar 411 can be rotated at high accuracy. The correction collar 411 and the motor 46 constitute the aberration correction unit.

The motor 46 is driven based on a control signal from an external controller, which is not shown, and rotates the correction collar 411 through the gear 46*a*.

Figure 10:
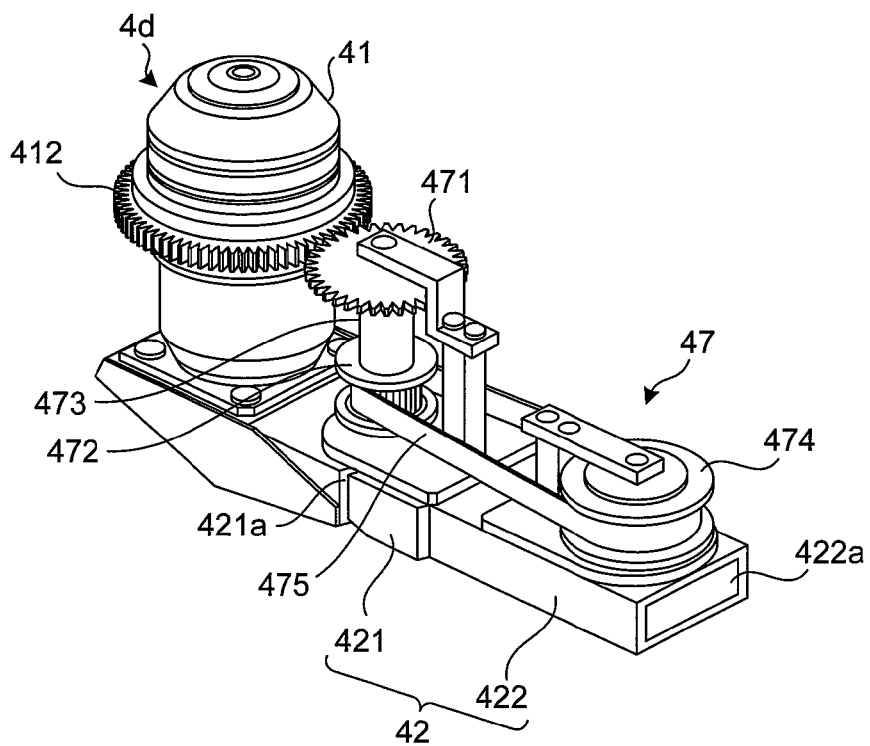
FIG. 10 is a perspective view schematically illustrating an example of another structure of the objective lens unit of the microscope system according to the first embodiment of the present invention.

FIG. 10 is a perspective view schematically illustrating an example of another structure of the objective lens unit of the microscope system according to the first embodiment. An objective lens unit 4*d* illustrated in FIG. 10 is provided with a power transmission mechanism 47 (driving source) for transmitting the power used for rotating a correction collar 412 provided for the objective lens 41. The power transmission mechanism 47 includes: a first gear 471 which meshes with the correction collar 412; a second gear 472 provided on the same central axis as the first gear 471; a shaft 473 connecting the first gear 471 and the second gear 472 and fixed rotatably to the objective lens holder 421; a third gear 474 rotatably provided for the grip unit 422; and a geared belt 475 which is formed by bonding opposite ends of a belt-shaped member and which meshes with the second gear 472 and the third gear 474 on the inner periphery.

In the power transmission mechanism 47, the rotation power of the third gear 474 is transmitted to the second gear 472 through the geared belt 475 when the user rotates the third gear 474. When the second gear 472 is rotated, the first gear 471 fixed to the shaft 473 is rotated in conjunction. By the rotation of the first gear 471, the correction collar 412 can be rotated.

In the objective lens unit 4d illustrated in FIG. 10, the correction collar 412 can be manually rotated by a user unlike in the objective lens unit 4c. Since the third gear 474 is provided on the grip unit 422, the operability is excellent.

Figure 11:
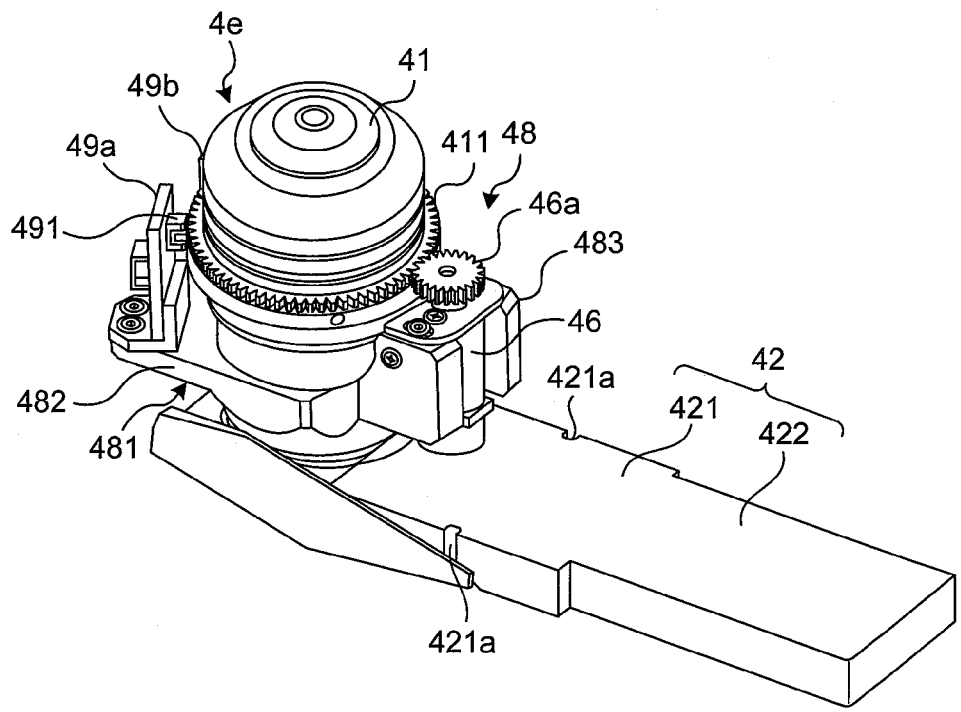
FIG. 11 is a perspective view schematically illustrating an example of another structure of the objective lens unit of the microscope system according to the first embodiment of the present invention.
Figure 12:
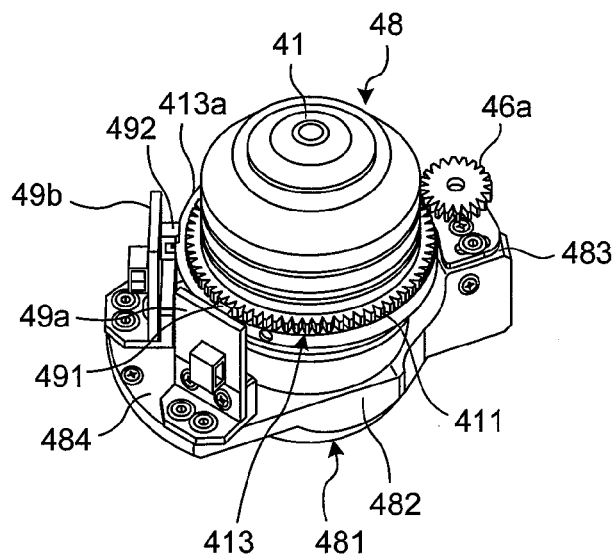
FIG. 12 is a perspective view schematically illustrating a structure of a main part of the objective lens unit illustrated in FIG. 11.
Figure 13:
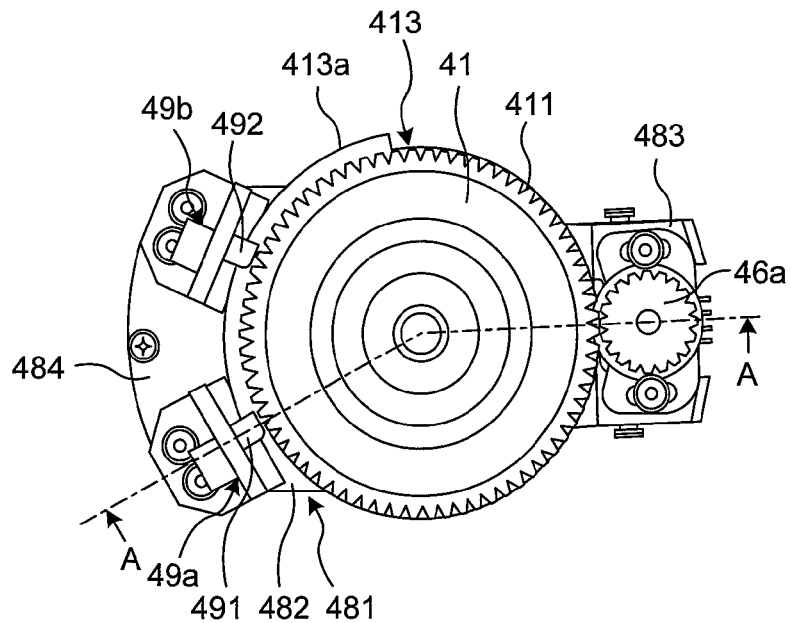
FIG. 13 is a top view schematically illustrating the structure of the main part of the objective lens unit illustrated in FIG. 11.
Figure 14:
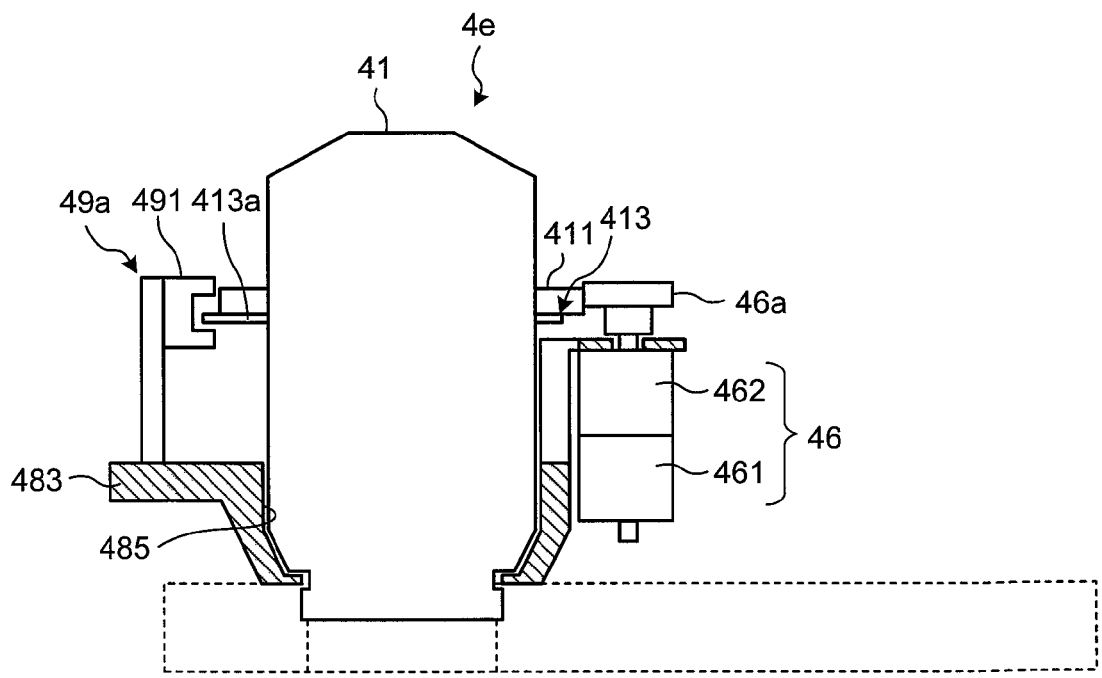
FIG. 14 is a partial sectional view taken along a line A-A of FIG. 13.
Figure 15:
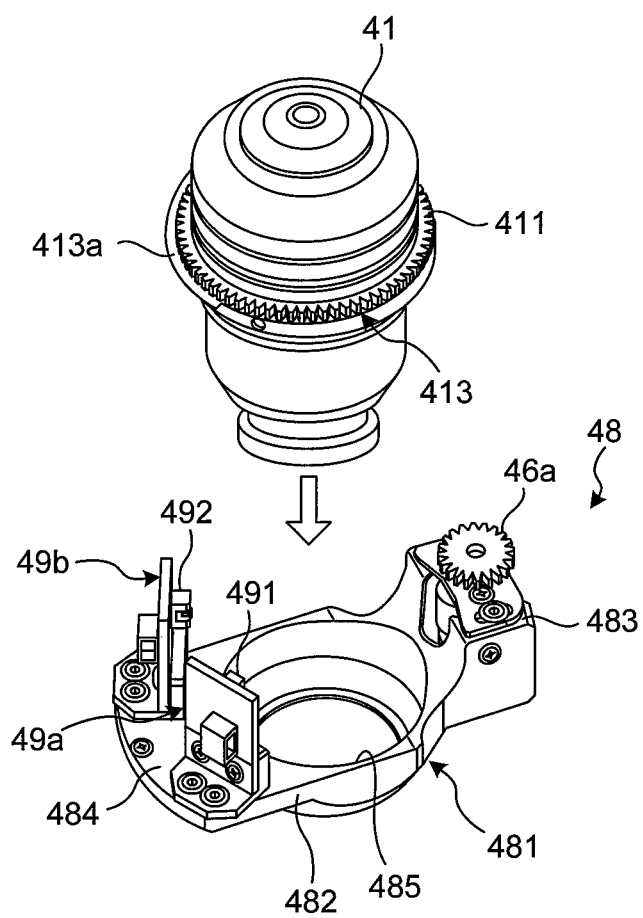
FIG. 15 is an exploded perspective view schematically illustrating a structure of a main part of the objective lens unit illustrated in FIG. 12.

FIG. 11 is a perspective view schematically illustrating an example of another structure of the objective lens unit of the microscope system according to the first embodiment. FIG. 12 is a perspective view schematically illustrating a structure of a main part of the objective lens unit illustrated in FIG. 11. FIG. 13 is a top view schematically illustrating the structure of the main part of the objective lens unit illustrated in FIG. 11. FIG. 14 is a partial sectional view taken along a line A-A of FIG. 13. FIG. 15 is an exploded perspective view schematically illustrating the structure of the main part of the objective lens unit illustrated in FIG. 12.

The objective lens unit 4e illustrated in FIG. 11 includes a detection mechanism 48 for detecting the position at which the correction collar 411 is set. The detection mechanism 48 includes, as illustrated in FIG. 15, a holding member 481 attached to the objective lens 41 and holding the motor 46 and detection sensors 49a and 49b (position detectors). The holding member 481 includes an objective lens attachment unit 482 through which the objective lens 41 is inserted and which is held by the objective lens 41, a motor holder 483 holding the motor 46, and a sensor holder 484 holding the detection sensors 49a and 49b. The objective lens attachment unit 482 is provided with a hole 485 through which the objective lens 41 can be inserted. The correction collar 411, the motor 46, the detection sensors 49a and 49b, and the holding member 481 constitute the aberration correction unit.

The objective lens 41 is provided with, in addition to the correction collar 411, a detection wing 413 (position detector) which is provided below the correction collar 411 and which is to be detected by the detection sensors 49a and 49b. The detection wing 413 has a cut shape formed by circumferentially cutting a part of a light-blocking member with a hollow circular plate shape on the outer peripheral side. The detection wing 413 has a projection 413a formed by the cut shape and having a part of the outer periphery projecting radially.

Each of the detection sensors 49a and 49b is formed by, for example, a photo-interrupter. The detection sensors 49a and 49b respectively have detection units 491 and 492 constituting a light emission unit and a light reception unit, and the projection 413a is disposed through and between the light emission unit and the light reception unit of the detection units 491 and 492. The light reception mode of the detection sensors 49a and 49b changes depending on whether the projection 413a has passed or not. This enables to detect the set position on the correction collar 411 depending on the change of the light reception mode.

Specifically, upon the detection of the projection 413a by the detection sensors 49a and 49b, the detection signal is turned off and if the projection 413a is not detected, the detection signal is turned on. When one point on the outer periphery of the detection wing 413 is set as a reference position (for example, end of cut portion), the position of the reference position relative to the detection sensors 49a and 49b can be detected by determining whether the detection signals of the two detection sensors 49a and 49b are on or off. In the case of moving the reference position to a specified position according to the detection result, it is possible to determine which direction is more appropriate to rotate the correction collar 411, clockwise or counterclockwise.

Figure 16:
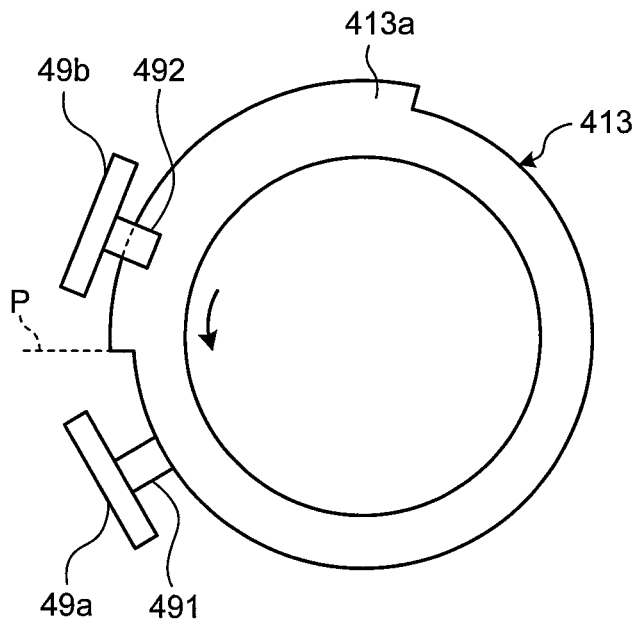
FIG. 16 is a diagram for describing the rotation control of a correction collar of the objective lens unit illustrated in FIG. 11.
Figure 17:
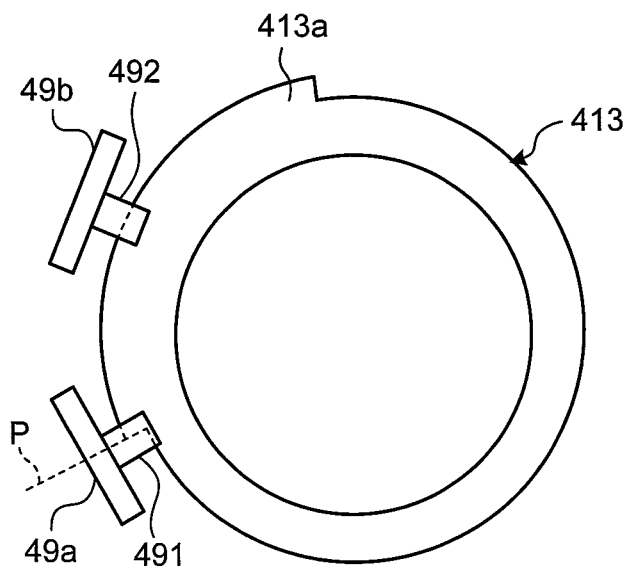
FIG. 17 is a diagram for describing the rotation control of the correction collar of the objective lens unit illustrated in FIG. 11.

FIG. 16 and FIG. 17 are diagrams for describing the rotation control of the correction collar of the objective lens unit illustrated in FIG. 11. The control signal related to the driving of the motor 46 or the position detection based on the detection result of the detection sensors 49a and 49b is output from a control unit provided for a specified signal line, the holding member 481, the unit side base portion 42, the main body side base portion 21, or the like. For example, when the driving of the motor 46 is controlled by the control unit and the reference position P of the detection wing 413 is aligned to the detection sensor 49a, the control unit first determines whether the detection signals of the two detection sensors 49a and 49b are on or off and detects the reference position P relative to the detection sensors 49a and 49b. For example, when the detection result of the detection sensor 49a is on and the detection result of the detection sensor 49b is off, the control unit determines that the reference position P is between the detection sensor 49a and the detection sensor 49b (see FIG. 16). After that, the control unit rotates the correction collar 411 counterclockwise until the detection signal of the detection sensor 49a is changed from on to off (see FIG. 17). By knowing the position of the correction collar 411 using the two detection sensors (detection sensors 49a and 49b) and the detection wing 413, the time needed to align the reference position P to the specified position can be shortened as compared to the conventional method of detecting the position of the correction collar 411 by rotating the correction collar once. Further, the optimum position adjustment of the correction collar 411 becomes possible and the favorable observation image can be obtained. In this case, the control unit functions as a part of the aberration correction unit.

Since the holding member 481 is detachably provided for the objective lens 41 and the unit side base portion 42, the same holding member 481 can be used even after the objective lens 41 is exchanged. When the objective lens 41 is inserted through the hole 485, by enabling the motor holder 483 to move (or rotate) in a direction apart from the objective lens attachment unit 482, the objective lens 41 can be more easily inserted because the interference between the objective lens 41 and the motor holder 483 (gear 46a) or the sensor holder 484 (detection units 491 and 492) is prevented. When the motor holder 483 is rotated, the motor holder 483 moves away from the objective lens attachment unit 482 if the rotation shaft of the motor 46 is tilted relative to the center axis of the hole 485. If the motor holder 483 is left tilted, the correction collar 411 can even be rotated manually.

As the detection sensors 49a and 49b, a photo-reflector or the like may be used instead of the photo-interrupter. The motor 46 preferably includes a stepping motor 461 and a decelerator 462 as illustrated in FIG. 14 because the stationary stability is high and the amount of rotation of the correction collar 411 can be controlled with high accuracy.

The electric power may be supplied to the motor 46 or the detection sensors 49a and 49b through a specified signal line or through a connector provided for the unit side base portion 42 or the like.

According to the first embodiment, since the objective lens unit 4 holding the objective lens 41 is attached from obliquely below the stage 3 in a manner that the objective lens unit 4 can be freely inserted or removed, the objective lens can be easily detached. Thus, the desired objective lens can be disposed without changing the position of the specimen S held on the stage 3, and the specimen S can be observed easily and certainly.

Here, if a cable or the like is connected to the objective lens attached to the revolver by the use of the added function in the conventional microscope, the signal line is entangled with another objective lens due to the rotation of the revolver, which may result in the disconnection of the signal line or the damage of the objective lens. In contrast to this, in the microscope system according to the first embodiment described above, the objective lens unit can be selectively inserted or removed and the objective lens unit with the function added can be attached; therefore, the desired objective lens can be disposed easily regardless of the function of the objective lens.

Moreover, in the conventional microscope, especially the inverted microscope, the top (on the side to be provided with the objective lens) of the revolver is covered by the stage; therefore, it is difficult to exchange the objective lens relative to the revolver as compared to the upright microscope. In contrast to this, in the microscope system according to the first embodiment, it is possible to easily exchange the objective lens (objective lens unit) without retracting the stage 3.

In the conventional microscope, when the cell is observed alive, the incubator having a function of maintaining the temperature is disposed on the stage, in which case the objective lens cannot be exchanged and the supply of the immersion oil is impossible. In contrast to this, in the microscope system according to the first embodiment, the immersion oil can be supplied without removing the incubator from the stage 3 and without moving the specimen S.

Modified Example of First Embodiment

Figure 18:
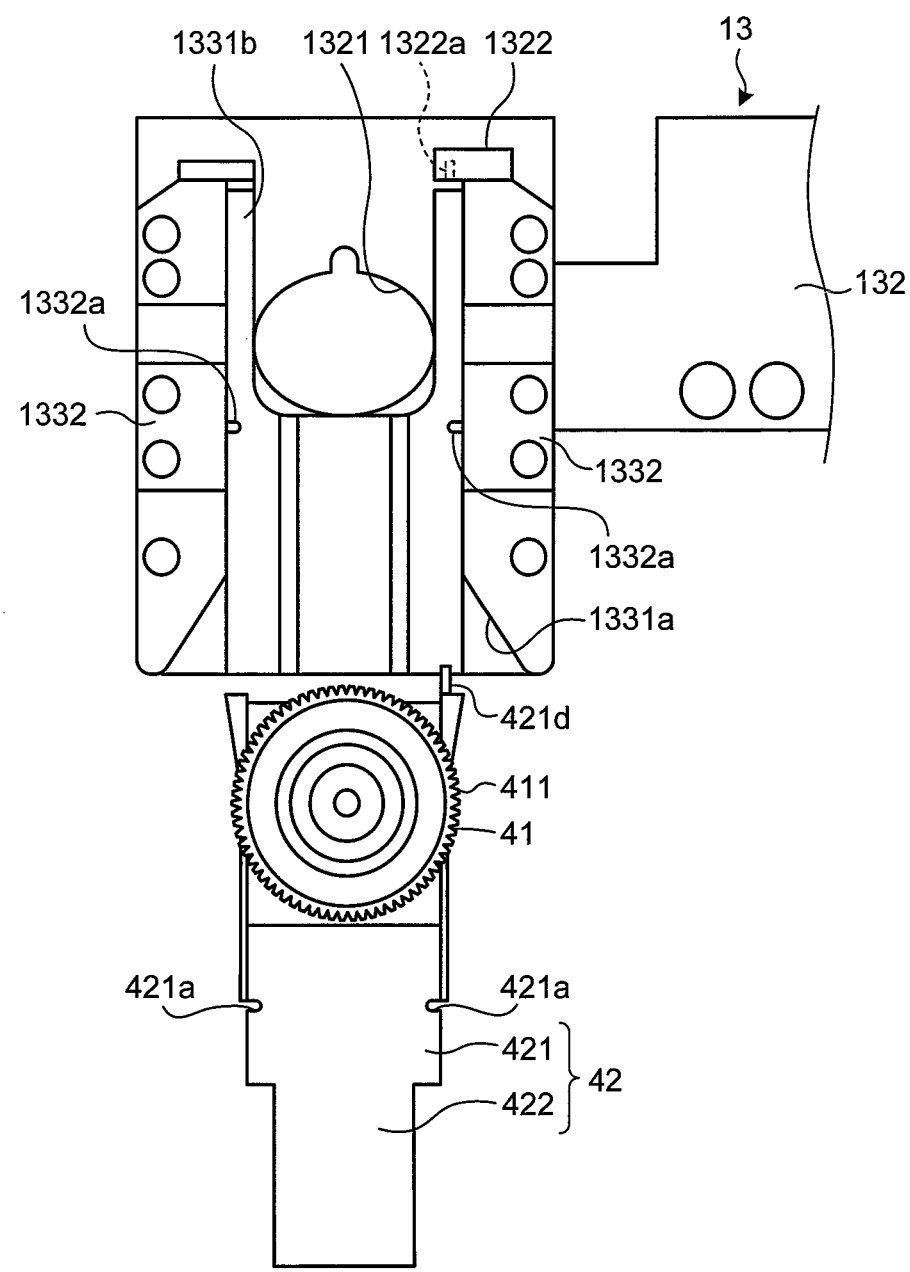
FIG. 18 is a top view schematically illustrating a structure of a main part of a microscope system according to a modified example of the first embodiment of the present invention.

FIG. 18 is a top view schematically illustrating the structure of the main part of the microscope system according to the modified example of the first embodiment. In this modified example, the above objective lens unit 4 and the unit attachment portion 13 are provided with an electric connection unit that enables the electric connection. In the objective lens unit 4 illustrated in FIG. 18, the objective lens holder 421 is provided with a conductive pin 421*d*. The unit attachment portion 13 is provided with a connection unit 1322 having a housing unit 1322*a* that can electrically be connected to the pin 421*d* when the objective lens unit 4 is attached. To the connection unit 1322, the electric power is supplied through the main body side base portion 21 or the like.

When the objective lens unit 4 is attached to the unit attachment portion 13, the pin 421*d* is housed in the housing unit 1322*a* and the objective lens unit 4 is electrically connected to the unit attachment portion 13. Thus, the electric power required to drive the objective lens units 4*a*, 4*c*, 4*d*, 4*e*, etc. can be supplied from the unit attachment portion 13 to the objective lens unit 4. The arrangement of the pin 421*d* and the housing unit 1322*a* is not limited thereto as long as the electric connection is possible; the pin 421*d* and the housing unit 1322*a* may be oppositely disposed or may be arranged to be electrically connected to each other wirelessly or by other known connection techniques. By the connection between the objective lens unit 4 and the unit attachment portion 13, the information related to the objective lens 41 attached to the objective lens unit 4 (for example, the magnification or the like) may be acquired by the connection unit 1322.

Second Embodiment

Figure 19:
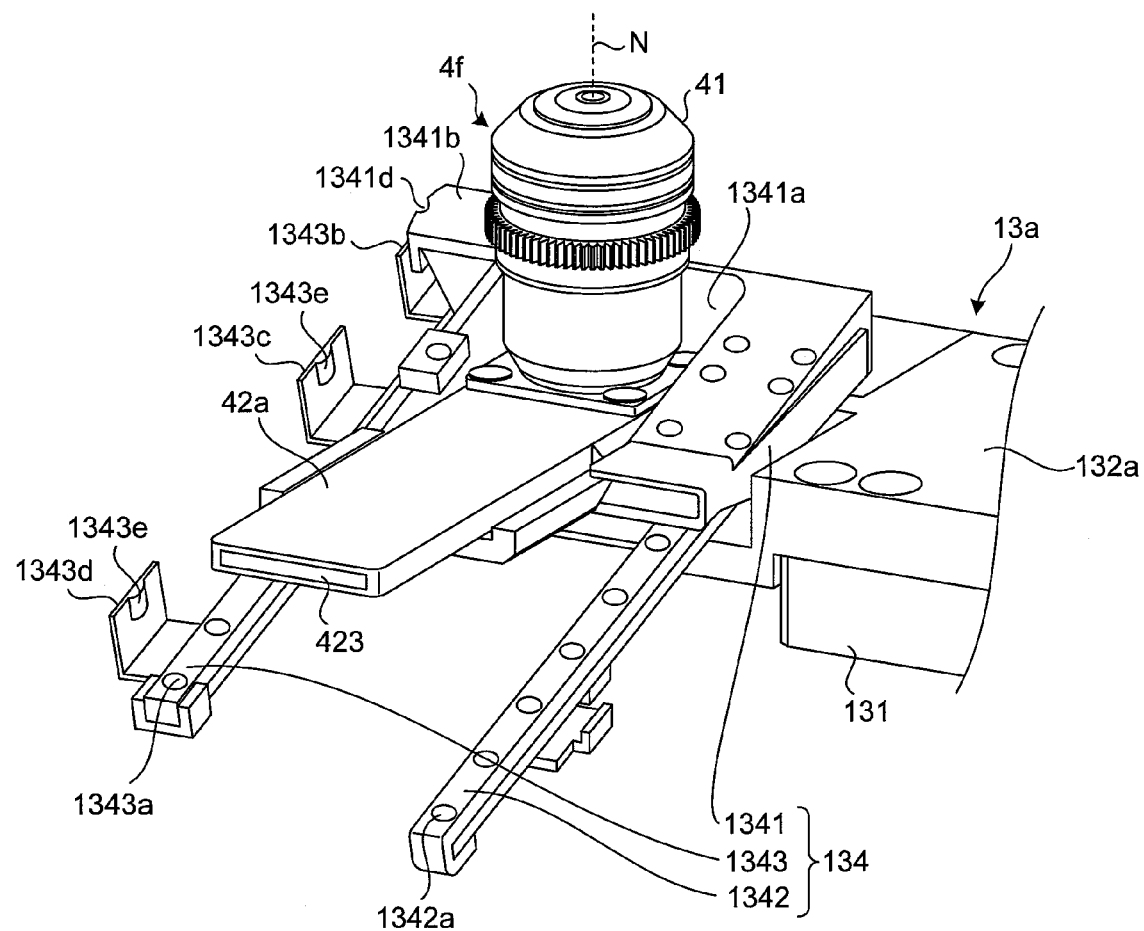
FIG. 19 is a perspective view schematically illustrating a structure of a main part of a microscope system according to a second embodiment of the present invention.
Figure 20:
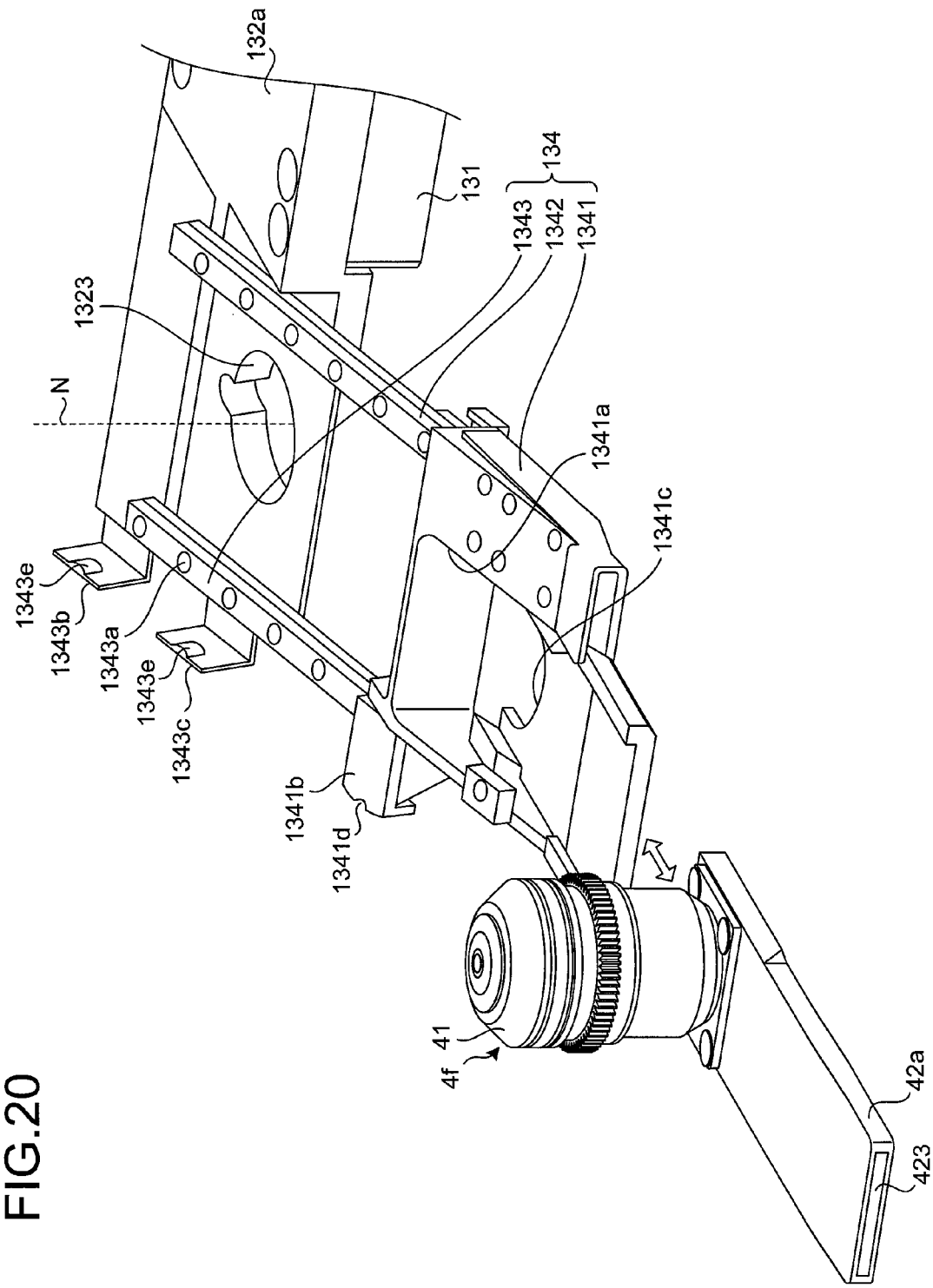
FIG. 20 is a perspective view schematically illustrating the structure of the main part of the microscope system according to the second embodiment of the present invention.

FIG. 19 is a perspective view schematically illustrating a structure of a main part of a microscope system according to a second embodiment of the present invention, in which an objective lens unit 4*f* is attached to a unit attachment portion 13*a*. FIG. 20 is a perspective view schematically illustrating the structure of the main part of the microscope system according to the second embodiment of the present invention, in which the objective lens unit 4*f* is detached from the unit attachment portion 13*a*. The same components as those of FIG. 1, etc. are denoted by the same reference signs. The microscope system according to the second embodiment includes the objective lens unit 4*f* and the unit attachment portion 13*a* instead of the objective lens unit 4 and the unit attachment portion 13 in the first embodiment.

The objective lens unit 4*f* includes the objective lens 41, and a unit side base portion 42*a* (base portion) with an approximately belt shape for holding the objective lens 41 on one end. The unit side base portion 42*a* holds the objective lens 41 on one end and the other end thereof is held by the user when the objective lens unit 4*f* is attached to the unit attachment portion 13*a*.

A side surface of the unit side base portion 42*a* that intersects with the longitudinal direction and that is opposite to the side at which the objective lens 41 is held is provided with a display unit 423 which displays the information related to the objective lens 41 held by the unit side base portion 42*a*.

The display unit 423 displays the information including at least the kind of the objective lens 41, the working distance (WD), and the magnification. In addition to this, the information including the kind of the immersion oil that can be used may be displayed. The information of the kind of the objective lens 41 includes the information related to the bright-field microscopy, the phase contrast microscopy, the differential interference contrast microscopy, the fluorescence observation, and the like, and the correction level for the chromatic aberration. The color of the other end side of the unit side base portion 42*a* may be different depending on the information of the objective lens 41.

The unit attachment portion 13*a* includes the aforementioned supporter 131, an intermediate portion 132*a* supported by the supporter 131 and extending in a direction intersecting with the optical path N, and a unit holder 134 held by the intermediate portion 132*a*, detachably holding the objective lens unit 4*f*, and inserting the objective lens unit 4*f* onto the optical path N and retracting the objective lens unit 4*f* from the optical path N.

The intermediate portion 132*a* is provided with an aperture portion 1323 having an aperture with an approximately circular shape through which the optical path N transmits when attached to the holder 22.

The unit holder 134 includes: a holder 1341 for holding detachably the objective lens unit 4*f*; an extension portion 1342 supported on the supporter 131 side of the intermediate portion 132*a* and extending in the approximately prism shape oblique to the optical path N; and an extension portion 1343 supported on the side opposite to the aperture portion 1323 relative to the extension portion 1342 and extending in the approximately prism shape in parallel to and at the same tilt angle as the extension portion 1342. The extension portions 1342 and 1343 extend obliquely downward from the intermediate portion 132*a*, and functions as a guiding portion that guides the attachment direction of the unit side base portion 42*a*.

The holder 1341 is disposed on the extension portions 1342 and 1343, and can move along the longitudinal direction of the extension portions 1342 and 1343. The holder 1341 includes a housing unit 1341*a* that can house the unit side base portion 42*a* of the objective lens unit 4*f* so that the unit side base portion 42*a* can be freely inserted into or removed from the housing unit 1341*a*, and a control member 1341*b* for controlling the position where the holder 1341 is stopped on the extension portions 1342 and 1343. The housing unit 1341*a* is provided with an aperture portion 1341*c* forming an aperture through which the illumination light or the observation light passes.

The extension portion 1342 is provided with a plurality of balls 1342a formed by projecting parts of the top surface of the extension portion 1342 and disposed rotatably in the longitudinal direction of the extension portion 1342.

The extension portion 1343 is provided with a plurality of balls 1343a formed by projecting parts of the top surface of the extension portion 1343 and disposed rotatably in the longitudinal direction of the extension portion 1343, and three engagement members (first engagement member 1343b, second engagement member 1343c, and third engagement member 1343d) with a flat plate shape that engage with the control member 1341b and have a main plane bent to have an L shape in side view. The three engagement members (first engagement member) include a bottom portion constituting a bottom part of L and a vertical portion constituting a vertical part of L.

The holder 1341 is attached so that the holder 1341 is not detached from the extension portions 1342 and 1343, and is supported by the balls 1342a and 1343a and can be smoothly moved by the rotation of the balls 1342a and 1343a. Specifically, for example, the holder 1341 has claws that are hooked by the bottoms of the extension portions 1342 and 1343, and by slidably having the claws hooked in the bottoms of the extension portions 1342 and 1343, the detachment of the holder 1341 from the extension portions 1342 and 1343 can be prevented in the state that the extension portions 1342 and 1343 can be freely moved in the longitudinal direction of the extension portions 1342 and 1343.

The first engagement member 1343b, the second engagement member 1343c, and the third engagement member 1343d are provided along the longitudinal direction of the extension portion 1343, and the bottoms thereof are supported so that the vertical portions thereof come to the side opposite to the extension portion 1342 relative to the extension portion 1343.

An end of the first engagement member 1343b is provided with a projection 1343e projecting toward the extension portion 1343. The second engagement member 1343c and the third engagement member 1343d are similarly provided with the projection 1343e.

Here, the control member 1341b is provided at a side end of the housing unit 1341a, and is located on the extension portion 1343 when the holder 1341 is inserted through the extension portions 1342 and 1343 to be able to be in contact with the projection 1343e of the engagement member. A surface of the control member 1341b that faces the vertical portion of the engagement member is provided with a cut portion 1341d (second engagement unit) with a cut shape that can be engaged with the projection 1343e.

The first engagement member 1343b, the second engagement member 1343c, and the third engagement member 1343d are disposed so that the position where the projection 1343e is hooked by the cut portion 1341d of the control member 1341b comes to the specified position. For example, the first engagement member 1343b is disposed at the position where the optical axis of the objective lens 41 coincides with the optical path N, the second engagement member 1343c is disposed at the position where the objective lens 41 does not interfere with the optical path N and the distance from the optical path N is the shortest, and the third engagement member 1343d is disposed at the position where the objective lens 41 is disposed at an end of the extension portion 1343.

When the objective lens unit 4f is attached to the unit attachment portion 13a and the objective lens 41 is disposed on the optical path N, the user first houses the unit side base portion 42a in the housing unit 1341a. On this occasion, the user holds the objective lens unit 4f while gripping the end of the unit side base portion 42a and inserts the objective lens unit 4f into the housing unit 1341a of the unit attachment portion 13a.

Note that when the insertion of the objective lens unit 4f into the housing unit 1341a is completed, a click mechanism may be provided at the completion position so as to prevent the detachment of the objective lens unit 4f from the housing unit 1341a. In the state that the objective lens unit 4f is housed in the housing unit 1341a, the optical axis of the objective lens 41 is preferably in parallel to the optical path N. By having the optical axis of the objective lens 41 in parallel to the optical path N, the movement can be made in the state that the optical axis of the objective lens 41 is maintained to be parallel to the optical path N.

After that, the holder 1341 moves along the extension portions 1342 and 1343. In the movement of the holder 1341, the holder 1341 can move smoothly owing to the rotation of the balls 1342a and 1343a provided for the extension portions 1342 and 1343. Thus, the objective lens unit 4f is inserted into the optical path N from obliquely below the stage 3.

After that, continuing the insertion sequentially engages the cut portion 1341d with the projections 1343e of the first engagement member 1343b, the second engagement member 1343c, and the third engagement member 1343d. In the second embodiment, the engagement occurs in the order of the third engagement member 1343d, the second engagement member 1343c, and the first engagement member 1343b, and the optical axis of the objective lens 41 coincides with the optical path N at the position where the projection 1343e of the first engagement member 1343b is engaged and stopped.

Moreover, when the objective lens 41 is disposed on the optical path N, the display unit 423 can be visually observed from outside. Thus, the information of the objective lens 41 attached to the unit attachment portion 13a can be easily checked.

On the other hand, when the objective lens unit 4f is removed, the holder 1341 is pulled out in a direction opposite to the attachment direction to cancel the engaged state between the cut portion 1341d and the projection 1343e. After that, continuing the pulling out can take out the holder 1341 to the position where the holder 1341 is engaged with the third engagement member 1343d. After that, the objective lens unit 4f can be replaced by the objective lens unit holding another kind of objective lens.

According to the second embodiment, the objective lens unit 4f holding the objective lens 41 is detachably attached to the holder 1341 from obliquely below the stage 3; therefore, the objective lens can be easily attached to or detached from the microscope main body.

According to the second embodiment, the objective lens unit 4f is housed in the holder 1341 and the objective lens 41 is disposed on the optical path N by moving the holder 1341; thus, the structure of the objective lens unit 4f can be made simple.

The objective lens unit 4f according to the second embodiment can have a mechanism of adding the functions of FIG. 5 to FIG. 11.

In the first and second embodiments, the objective lens unit is attached to the unit holder from one direction; alternatively, the objective lens unit may be attached to the unit holder from a plurality of directions. In this case, by providing a second tilt portion on the side opposite to the tilt portion 1331, the objective lens unit 4 can be attached from the opposite direction.

In the first embodiment, a plurality of click mechanisms may be provided at the positions of the engagement members described in the second embodiment.

Third Embodiment

Figure 21:
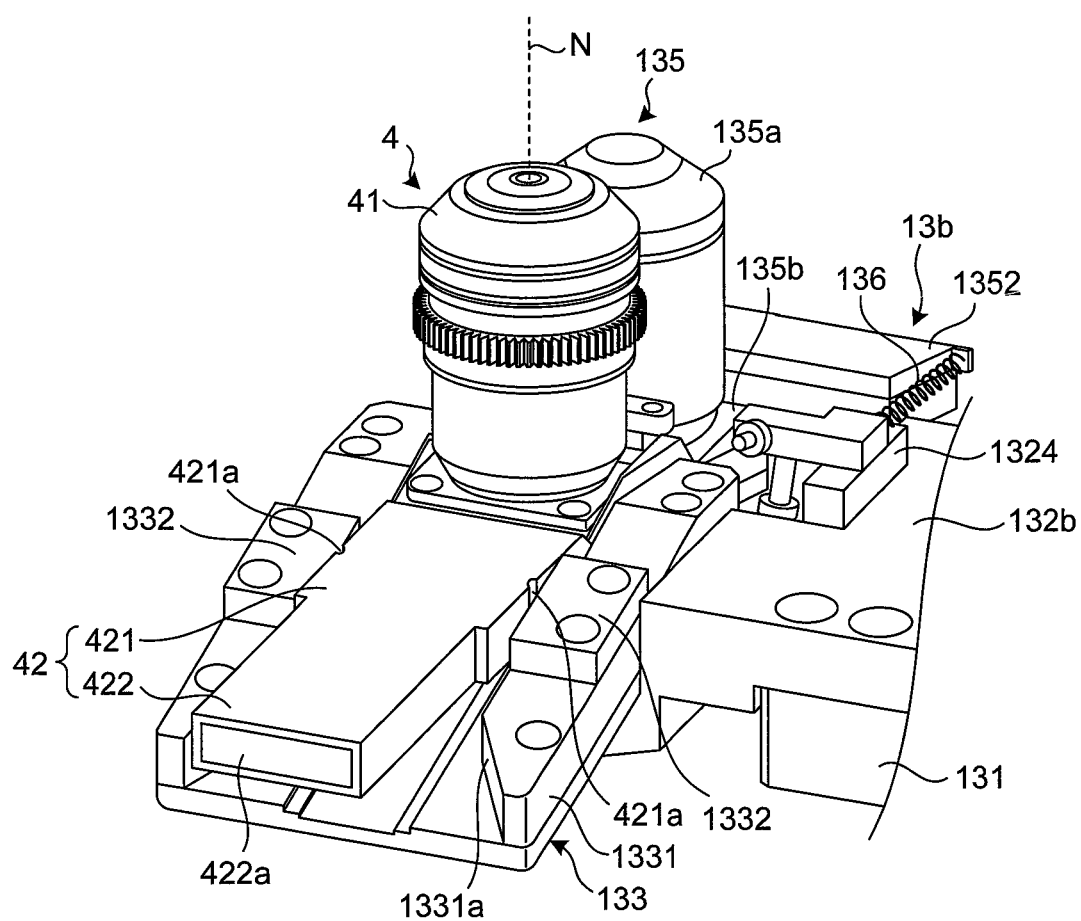
FIG. 21 is a perspective view schematically illustrating a structure of a main part of a microscope system according to a third embodiment of the present invention.
Figure 22:
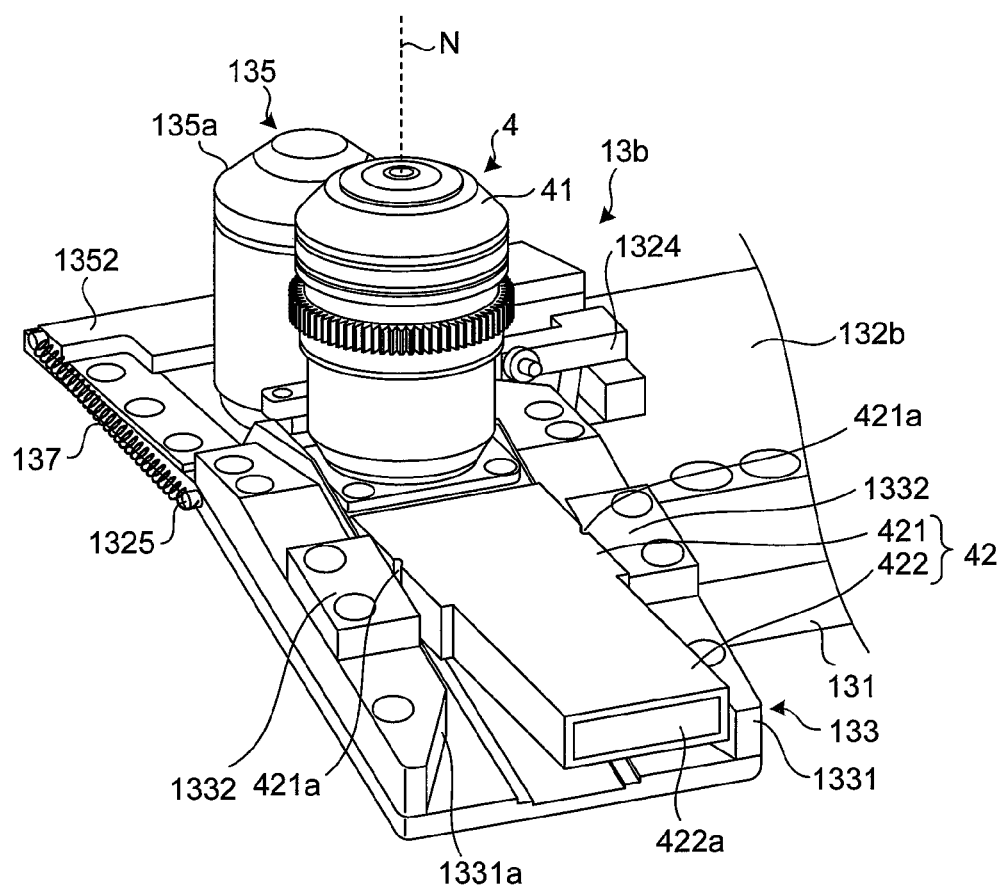
FIG. 22 is a perspective view schematically illustrating the structure of the main part of the microscope system according to the third embodiment of the present invention.
Figure 23:
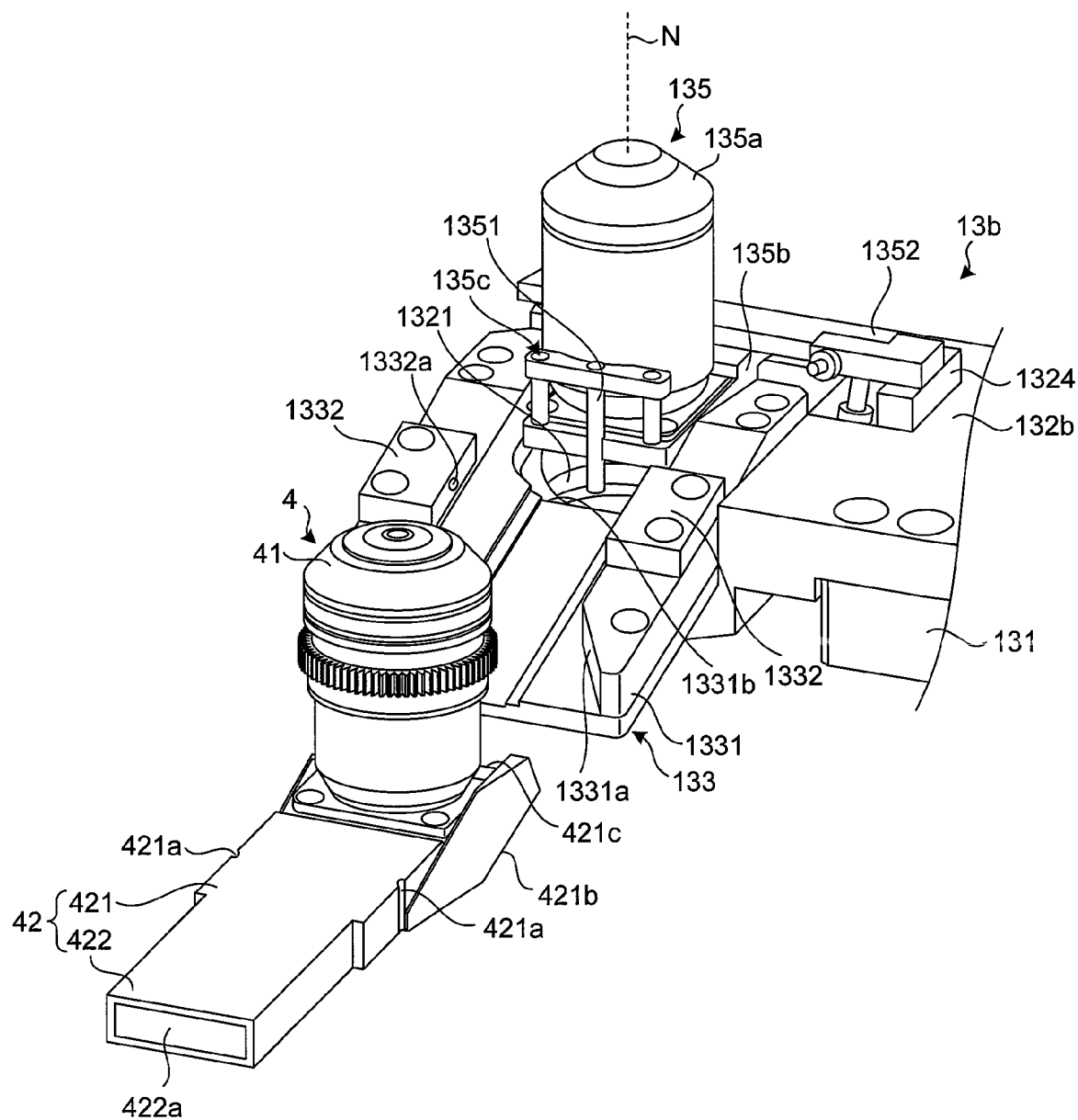
FIG. 23 is a perspective view schematically illustrating the structure of the main part of the microscope system according to the third embodiment of the present invention.
Figure 24:
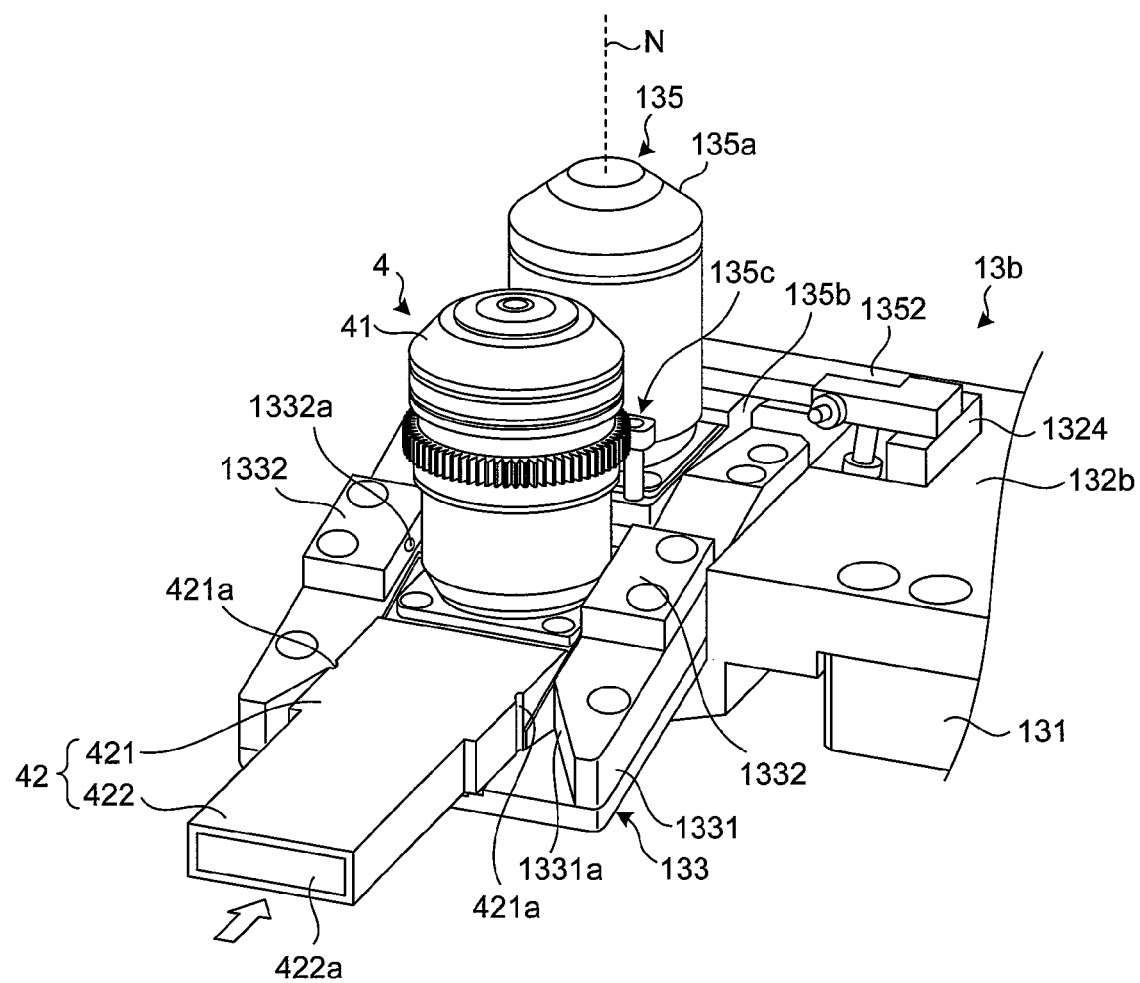
FIG. 24 is a perspective view schematically illustrating the structure of the main part of the microscope system according to the third embodiment of the present invention.

FIG. 21 is a perspective view schematically illustrating a structure of a main part of a microscope system according to a third embodiment of the present invention, in which the objective lens unit 4 is attached to a unit attachment portion 13b. FIG. 22 is a perspective view schematically illustrating the structure of the main part of the microscope system according to the third embodiment of the present invention, in which the objective lens unit 4 is attached to the unit attachment portion 13b and which is viewed from the direction opposite to that of FIG. 21. FIG. 23 is a perspective view schematically illustrating the structure of the main part of the microscope system according to the third embodiment, in which the objective lens unit 4 is detached from the unit attachment portion 13b. FIG. 24 is a perspective view schematically illustrating the structure of the main part of the microscope system according to the third embodiment, which describes the attachment of the objective lens unit 4 to the unit attachment portion 13b. The same components as those of FIG. 1, etc. are denoted by the same reference signs. The microscope system according to the third embodiment includes a unit attachment portion 13b instead of the unit attachment portion 13 according to the first embodiment.

The unit attachment portion 13b includes: the supporter 131 fixed to the holder 22; an intermediate portion 132b supported by the supporter 131; the unit holder 133 that is held by the intermediate portion 132b and detachably holds the objective lens unit 4; an objective lens holder 135 that is held by the intermediate portion 132b and holds an objective lens 135a (second objective lens) such that the objective lens 135a can freely advance or retract relative to the optical path N; and energizing members 136 and 137 that energize the objective lens holder 135 in a direction intersecting with the optical path N.

The intermediate portion 132b has the aperture portion 1321 having an aperture with an approximately circular shape through which the optical path N passes when attached to the holder 22. The intermediate portion 132b includes: a support member 1324 that is provided adjacent to the holder part of the unit holder 133 on the supporter 131 side, supporting the energizing member 136, and restricting the movement of the objective lens holder 135; and a support member 1325 provided on the side surface near the aperture portion 1321, which is on the side opposite to the supporter 131, and supporting the energizing member 137.

The objective lens holder 135 includes: the objective lens 135a with a specified magnification; a holder 135b holding the objective lens 135a and movably provided in the direction where the lens is attached or detached relative to the optical path N; and a contact unit 135c brought into contact with the objective lens unit 4 by the insertion of the objective lens unit 4. The contact unit 135c has a contact member 1351 with an approximately rod shape. The contact member 1351 extends in a direction parallel to the optical path N, and has a part advancing into the aperture portion 1321. As the objective lens 135a, for example, an objective lens with lower magnification than the objective lens 41 attached to the objective lens unit 4 is used.

The holder 135b is provided on the side opposite to the contact unit 135c relative to the objective lens 135a and includes a belt-shaped member 1352 with an approximately belt shape. The belt-shaped member 1352 is disposed with the longitudinal direction thereof orthogonal to the direction where the holder 135b moves. The length of the belt-shaped member 1352 in the longitudinal direction is approximately the same as the width of the unit holder 133.

The energizing member 136 connects the support member 1324 provided for the intermediate portion 132b, and one end of the belt-shaped member 1352 (end on the supporter 131 side). The energizing member 137 connects the support member 1325 provided for the intermediate portion 132b and the other end of the belt-shaped member 1352. The energizing members 136 and 137 have the minimum energizing force when the objective lens 135a is disposed on the optical path N, and have larger energizing force as the objective lens 135a is set apart from the optical path N. In other words, the energizing members 136 and 137 energize the objective lens holder 135 in a direction toward the optical path N, which is the direction intersecting with the optical path N. The energizing members 136 and 137 are formed using, for example, a coil spring.

To attach the objective lens unit 4 to the unit attachment portion 13b, the slidable unit 421b is slid along the guide groove 1331a to be inserted in a manner similar to the first embodiment. Note that in the state that the objective lens unit 4 is not inserted onto the optical path N, the holder 135b is in contact with the support member 1324 and the objective lens 135a is disposed on the optical path N.

On this occasion, by the insertion of the objective lens unit 4, the contact member 1351 is brought into contact with a contact surface 421c of the objective lens holder 421. After that, continuing the insertion of the objective lens unit 4 makes the objective lens unit 4 press the contact member 1351, whereby the objective lens holder 135 moves to retract from the optical path N. Thus, the objective lens 135a retracts from the optical path N.

Then, further continuing the insertion makes the cut portion 421a of the objective lens holder 421 engage with the ball 1332a of the click mechanism 1332 (see FIG. 21 and FIG. 22). At the position where the objective lens unit 4 is stopped by this engagement, the optical axis of the objective lens 41 coincides with the optical path N. On this occasion, the holder 135b is in the state of being energized toward the optical path N by the energizing members 136 and 137.

On the other hand, when the objective lens unit 4 is removed, the user pulls out the objective lens unit 4 in a direction opposite to the attachment direction while gripping the grip unit 422, thereby cancelling the engaged state between the cut portion 421a and the ball 1332a. After that, continuing the pulling out can remove the objective lens unit 4 from the unit attachment portion 13b and the objective lens unit 4 can be replaced by the objective lens unit holding another kind of objective lens. By the energizing force from the energizing members 136 and 137, the holder 135b moves toward the optical path N following the movement of the objective lens unit 4, and upon the contact with the support member 1324, the objective lens 135a comes on the optical path N again.

According to the third embodiment, the objective lens unit 4 holding the objective lens 41 is detachably attached from obliquely below the stage 3 in a manner similar to the first embodiment; therefore, the objective lens can be easily attached to or detached from the microscope main body.

Moreover, according to the third embodiment, the objective lens 135a with different magnification from the objective lens 41 is disposed so that the objective lens 135a can advance or retract freely relative to the optical path N and the objective lens to be disposed on the optical path N can be replaced by the insertion of the objective lens unit 4; thus, by disposing the frequently used objective lens in advance, the objective lens can be replaced just by the insertion or removal of the objective lens unit 4. Accordingly, the specimen can be observed with higher efficiency.

When the cell is observed alive, the incubator with a function of maintaining the temperature constant may be disposed on the stage 3. In the general microscope observation, the portion of the specimen S to be observed is found using the low-magnification objective lens that enables the observation of a wide field and then the detailed observation is made with the high-magnification objective lens to which the immersion oil is supplied. In the conventional microscope, however, when the low-magnification objective lens having a wide field is replaced by the high-magnification objective lens requiring the immersion oil, the presence of the incubator interrupts the oil supply. In contrast, in the microscope system according to the third embodiment, as long as the low-magnification objective lens is disposed in advance, the observation at the low magnification to the high magnification can be smoothly conducted by disposing the high-magnification objective lens to which the immersion oil is supplied on the optical path N after the observation with the low-magnification objective lens.

In the third embodiment, the contact surface 421c of the objective lens holder 421 may have a cut shape according to the shape of the contact member 1351. This makes more certain the slidable contact between the contact surface 421c and the contact member 1351.

The objective lens holder 135 according to the third embodiment can be applied to the structure of the second embodiment. On this occasion, the intermediate portion 132a is replaced by the intermediate portion 132b, and the energizing members 136 and 137 are attached.

Moreover, the aforementioned oil removal unit 45 (oil-absorbent paper holding member 45a) may be disposed instead of the objective lens holder 135 according to the third embodiment. In the case of using the objective lens 41 to which the immersion oil has been supplied in the observation, the oil removal unit 45 is disposed on the optical path N and the immersion oil can be automatically removed from the dish 100 when the objective lens unit 4 is detached.

In the aforementioned first to third embodiments, the stage 3 may be able to move up and down along the direction of the optical path N, or the supporter 131 may be provided with a driving mechanism to enable the up and down movement of the intermediate portions 132, 132a, and 132b along the optical path N.

The first to third embodiments have described the inverted microscope system; however, the present invention can be applied also to an upright microscope system. Specifically, for example, the dovetail groove formed in the guide groove 1331a and the convex portion formed in the slidable unit 421b of the objective lens unit 4 are fitted to each other to prevent the drop due to the gravity.

The first to third embodiments above are just the examples of the present invention and the present invention is not limited thereto. Various inventions can be accomplished by combining a plurality of components disclosed in the embodiments or modified example as appropriate. The present invention can be variously modified according to the specification, etc. and it is apparent that various embodiments can be applied within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system comprising:
   a stage;
   a main body portion having an optical system for forming an image from observation light from a specimen on the stage;
   an objective lens unit having a single objective lens for taking in the observation light and having a base portion, the base portion including an objective lens holder for holding the objective lens on a first end, and a grip unit configured to be held by a user on a second end; and
   a unit attachment portion that is held by the main body portion in a hollow space with a concave shape formed by the stage and the main body portion, the unit attachment portion being configured to detachably attach the base portion at a position such that an optical axis of the objective lens coincides with an optical path of the observation light, and the unit attachment portion including a tilt portion which extends obliquely downward away from the stage and comprises a guide unit configured to guide an attachment direction of the base portion,
   wherein the hollow space and the unit attachment portion are configured such that when the objective lens unit is attached to the unit attachment portion, the objective lens unit is inserted to the unit attachment portion from obliquely below the stage while the objective lens unit is slid along the guide unit of the tilt portion.

2. The microscope system according to claim 1, wherein the unit attachment portion includes:
   a supporter fixed to the main body portion;
   an intermediate portion that is supported by the supporter, extends in a direction intersecting with the optical path, and has an aperture portion through which the optical path passes; and
   a unit holder that is held by the intermediate portion, is configured to detachably hold the objective lens unit, and comprises the tilt portion.

3. The microscope system according to claim 2, wherein the unit holder includes:
   a first engagement unit provided on the tilt portion and engageable with the base portion, and
   wherein the base portion includes:
   a slidable unit that is slidable along the guide unit; and
   a second engagement unit engageable with the first engagement unit.

4. The microscope system according to claim 2, wherein the unit holder includes:
   a holder that is movable along the guide unit and is configured to detachably hold the objective lens unit;
   a first engagement unit provided in the guide unit and engaged with the holder; and
   a second engagement unit provided in the holder and engaged with the first engagement unit.

5. The microscope system according to claim 4, wherein the base portion includes a display unit that is provided on a side surface of the grip unit configured to be held by the user on the second end and is configured to display information of the objective lens held by the base portion.

6. The microscope system according to claim 2, wherein the unit attachment portion further includes:
   an objective lens holder that is held by the intermediate portion and is configured to hold a second objective lens different from the objective lens such that the second objective lens can freely advance or retract relative to the optical path; and an energizing unit configured to energize the objective lens holder in a direction intersecting with the optical path.

7. The microscope system according to claim 1, wherein the objective lens unit comprises an aberration correction unit including:
   a correction collar that is provided in the objective lens and is configured to correct aberration by moving an optical system provided inside the objective lens in a direction of the optical axis; and
   a driving source for rotating the correction collar.

8. The microscope system according to claim 7, wherein the aberration correction unit further includes a position detection unit configured to detect a position of the correction collar.

9. An objective lens unit used for a microscope system including: a main body portion having an optical system for forming an image from observation light from a specimen on a stage; and a unit attachment portion that is held by the main body portion in a hollow space with a concave shape formed by the stage and the main body portion, the unit attachment portion including a tilt portion which extends obliquely downward away from the stage and comprises a guide unit configured to guide an attachment direction of the base portion, the objective lens unit comprising:
   a single objective lens for taking in the observation light; and
   a base portion that has an objective lens holder for holding the objective lens on a first end and has a grip unit configured to be held by a user on a second end, and is configured to be detachably attached to the unit attachment portion at a position such that an optical axis of the objective lens coincides with an optical path of the observation light,
   wherein the base portion is configured to be inserted to the unit attachment portion from obliquely below the stage while the objective lens unit is slid along the guide unit of the tilt portion.

10. The objective lens unit according to claim 9, further comprising an aberration correction unit including:
   a correction collar that is provided in the objective lens and is configured to correct aberration by moving an optical system provided inside the objective lens in a direction of an optical axis; and
   a driving source for rotating the correction collar.

11. The objective lens unit according to claim 10, wherein the aberration correction unit further includes a position detection unit configured to detect a position of the correction collar.

12. A microscope main body used for a microscope system for focusing observation light from a specimen on a stage, the microscope main body comprising:
   an optical system for forming an image from the observation light; and
   a unit attachment portion configured to attach a base portion of an objective lens unit having a single objective lens for taking in the observation light and having the base portion including an objective lens holder for holding the objective lens on a first end, and a grip unit configured to be held by a user on a second end, at a position such that an optical axis of the objective lens coincides with an optical path of the observation light, the unit attachment portion including a tilt portion which extends obliquely downward away from the stage and comprises a guide unit configured to guide an attachment direction of the base portion in a hollow space with a concave shape formed by the stage and the main body portion.

13. The microscope system according to claim 1, further comprising another objective lens holder unit which is exchangeable with the objective lens holder unit at the unit attachment portion, the another objective lens holder unit holding another objective lens with a different magnification from the objective lens held by the objective lens holder unit.

14. The objective lens unit according to claim 9, further comprising a heating member configured to be heated such that the objective lens is maintained at a specific temperature.

15. The objective lens unit according to claim 9, further comprising a supply tube for supplying immersion oil to the objective lens.

* * * * *